United States Patent
Zhang et al.

(10) Patent No.: US 12,485,283 B2
(45) Date of Patent: Dec. 2, 2025

(54) CLOSED LOOP STIMULATION BASED ON RESPONSE AVOIDANCE

(71) Applicant: Boston Scientific Neuromodulation Corporation, Valencia, CA (US)

(72) Inventors: Tianhe Zhang, Studio City, CA (US); Rosana Esteller, Santa Clarita, CA (US)

(73) Assignee: Boston Scientific Neuromodulation Corporation, Valencia, CA (US)

( * ) Notice: Subject to any disclaimer, the term of this patent is extended or adjusted under 35 U.S.C. 154(b) by 506 days.

(21) Appl. No.: 17/979,167

(22) Filed: Nov. 2, 2022

(65) Prior Publication Data

US 2023/0144885 A1 May 11, 2023

Related U.S. Application Data

(60) Provisional application No. 63/276,026, filed on Nov. 5, 2021.

(51) Int. Cl.
*A61N 1/36* (2006.01)

(52) U.S. Cl.
CPC ..... *A61N 1/36139* (2013.01); *A61N 1/36178* (2013.01)

(58) Field of Classification Search
None
See application file for complete search history.

(56) References Cited

U.S. PATENT DOCUMENTS 8,606,362 B2  12/2013  He et al.
8,620,436 B2  12/2013  Parramon et al.
(Continued)

FOREIGN PATENT DOCUMENTS

EP  3838331 A1  6/2021
EP  3870274 A1  9/2021
(Continued)

OTHER PUBLICATIONS

"Australian Application Serial No. 2022380481, First Examination Report mailed Feb. 14, 2025", 3 pgs.
"Australian Application Serial No. 2022380481, Response filed May 19, 2025 to First Examination Report mailed Feb. 14, 2025", w/ English Claims, 10 pgs.
(Continued)

*Primary Examiner* — Carl H Layno
*Assistant Examiner* — Bryan McAllister Lee
(74) *Attorney, Agent, or Firm* — Schwegman Lundberg & Woessner, P.A.

(57) ABSTRACT

Systems and methods for closed-loop control of electrostimulation while avoiding, or maintaining a substantially low level of, evoked neural activity are disclosed. A system comprises an electrostimulator to deliver a stimulation pulse train, a sensing circuit to sense evoked responses to respective pulses in the pulse train, and a controller to detect an evoked neural activity from an averaged evoked response by averaging evoked responses to respective pulses. The averaging operation can be controlled by a noise level of the averaged evoked response, or by a count of epochs (pulses) being used for averaging. Responsive to the evoked neural activity satisfying a detection criterion, the controller recursively adjusts stimulation parameters until the detection criterion is no longer satisfied. The electrostimulator delivers electrostimulation according to the recursively adjusted stimulation parameters.

20 Claims, 13 Drawing Sheets

(56) References Cited

U.S. PATENT DOCUMENTS

| | | | |
|---|---|---|---|
| 9,259,574 | B2 | 2/2016 | Aghassian et al. |
| 9,265,431 | B2* | 2/2016 | Hincapie Ordonez ............... A61N 1/36053 |
| 10,926,092 | B2* | 2/2021 | Esteller .............. A61N 1/36071 |
| 2014/0236257 | A1 | 8/2014 | Parker et al. |
| 2015/0080982 | A1 | 3/2015 | Van Funderburk |
| 2015/0217117 | A1 | 8/2015 | Hershey |
| 2015/0231402 | A1 | 8/2015 | Aghassian |
| 2015/0360038 | A1 | 12/2015 | Zottola et al. |
| 2016/0144183 | A1 | 5/2016 | Marnfeldt |
| 2018/0071513 | A1 | 3/2018 | Weiss et al. |
| 2018/0071520 | A1 | 3/2018 | Weerakoon et al. |
| 2019/0099602 | A1* | 4/2019 | Esteller .............. A61N 1/37241 |
| 2019/0217092 | A1 | 7/2019 | Baynham et al. |
| 2019/0388692 | A1 | 12/2019 | Dinsmoor et al. |
| 2020/0316384 | A1* | 10/2020 | Grill ...................... G16H 20/40 |
| 2023/0144885 | A1* | 5/2023 | Zhang ................. A61B 5/4824 607/62 |

FOREIGN PATENT DOCUMENTS

| | | |
|---|---|---|
| WO | WO-2020082118 A1 | 4/2020 |
| WO | WO-2021252257 A1 | 12/2021 |
| WO | WO-2022183161 A1 | 9/2022 |
| WO | WO-2023081180 A1 | 5/2023 |

OTHER PUBLICATIONS

"European Application Serial No. 22821732.9, Response to Communication Pursuant to Rules 161 and 162 filed Nov. 12, 2024", 5 pgs.

"International Application Serial No. PCT/US2022/048657, International Preliminary Report on Patentability mailed May 16, 2024", 8 pgs.

"International Application Serial No. PCT/US2022/048657, International Search Report mailed Feb. 6, 2023", 6 pgs.

"International Application Serial No. PCT/US2022/048657, Written Opinion mailed Feb. 6, 2023", 6 pgs.

* cited by examiner

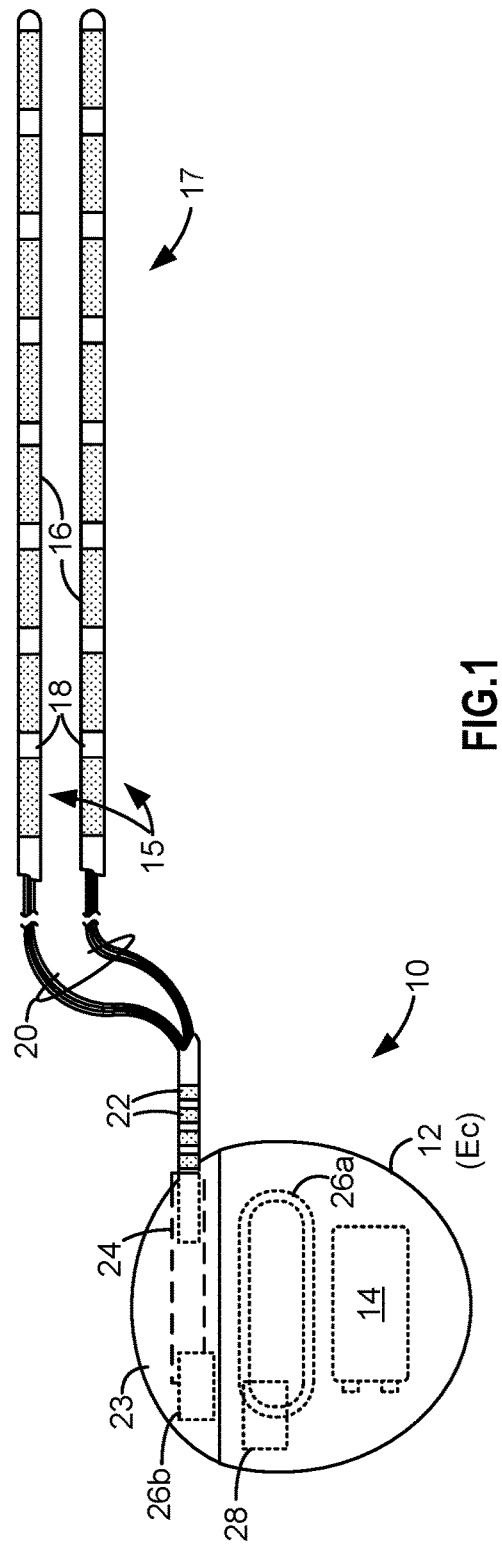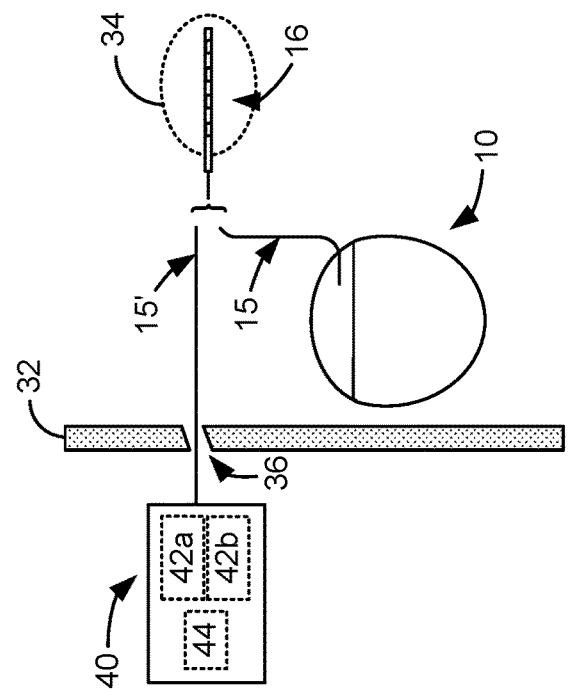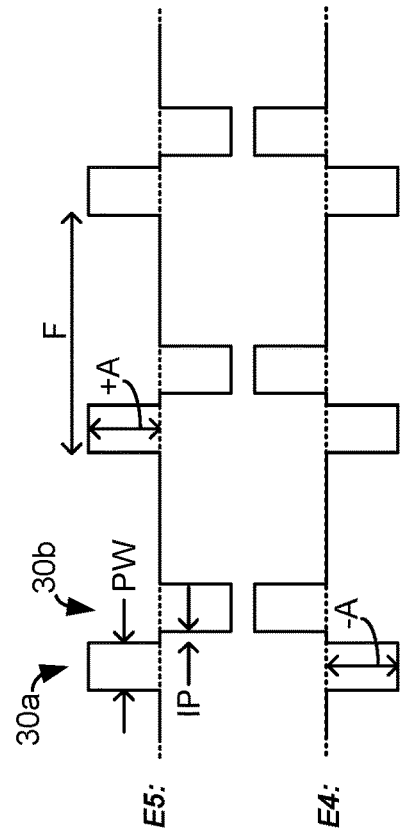

CLOSED LOOP STIMULATION BASED ON RESPONSE AVOIDANCE

CLAIM OF PRIORITY

This application claims the benefit of U.S. Provisional Application No. 63/276,026, filed on Nov. 5, 2021, which is hereby incorporated by reference in its entirety.

TECHNICAL FIELD

This document relates generally to medical devices, and more particularly, to closed-loop electrostimulation while avoiding, or maintaining a substantially low level of, evoked neural activities.

BACKGROUND

Neuromodulation (or "neural neuromodulation", also referred to as "neurostimulation" or "neural stimulation") has been proposed as a therapy for a number of conditions. Often, neuromodulation and neural stimulation may be used interchangeably to describe excitatory stimulation that causes action potentials as well as inhibitory and other effects. Examples of neuromodulation include Spinal Cord Stimulation (SCS), Deep Brain Stimulation (DBS), Peripheral Nerve Stimulation (PNS), and Functional Electrical Stimulation (FES). SCS systems have been used as a therapeutic modality for the treatment of chronic pain syndromes. PNS has been used to treat chronic pain syndrome and incontinence, with a number of other applications under investigation. FES systems have been applied to restore some functionality to paralyzed extremities in spinal cord injury patients. DBS can be used to treat a variety of diseases or disorders.

Stimulation systems, such as implantable electrostimulators, have been developed to provide therapy for a variety of treatments. An implantable electrostimulator can include a pulse generator and one or more leads each including a plurality of stimulation electrodes. The stimulation electrodes are in contact with or near target tissue to be stimulated, such as nerves, muscles, or other tissue. The control module generates a control signal to the pulse generator, which generates electrostimulation pulses that are delivered by the electrodes to the target tissue in accordance with an electrode configuration and a set of stimulation parameters.

Paresthesia-based spinal cord stimulation (SCS) has been used to treat chronic pain. Paresthesia is a sensation such as tingling, prickling, heat, cold, etc. that can accompany SCS therapy. Alternatively, SCS may be delivered with reduced strength below a paresthesia threshold to avoid inducing paresthesia, yet still achieve analgesia effect and clinically effective pain relief Such paresthesia-free SCS, also known as sub-perception SCS, generally uses stimulation pulses at higher frequencies to achieve the paresthesia-free effect, which may consume more power than paresthesia-based SCS.

SUMMARY

Conventional paresthesia-free or sub-perception SCS has some drawbacks including prolonged wash-in time. For example, in contrast to paresthesia-based SCS in which analgesia is usually observed within minutes, conventional sub-perception SCS typically takes several hours to days until maximum or therapeutically effective analgesia effect can be achieved. Patients treated with conventional sub-perception therapies do not typically receive pain relief during their programming visit, and the effectiveness of the treatment cannot be immediately assured. Additionally, conventional sub-perception electrostimulation (e.g., SCS) generally uses higher-frequency pulses, therefore consumes more power and tends to drain the battery of an implantable pulse generator more quickly and shortens the battery life. Furthermore, therapy optimization can be a complex and onerous process for the conventional sub-perception SCS.

An improved sub-perception SCS, referred to as Fast-Acting Sub-Perception Therapy (FAST), has emerged as a highly effective and energy-efficient solution for sub-perception SCS, and can significantly reduce the wash-in time. The FAST methodology utilizes a stimulation frequency at a level below 100 Hz (or in some instances lower than 10 Hz) and a biphasic-symmetric waveform comprising an active charge phase followed by an active charge recovery phase (also referred to as a recharge phase). Compared to conventional sub-perception SCS therapies, FAST can achieve fast-acting analgesia, and significant and long-lasting pain relief (about six months after being activated in an example). In addition to its therapeutic benefit, FAST is also advantageous with comparatively lower energy consumption.

FAST may be used to activate various neural targets including, for example, dorsal columns. That dorsal columns originate from peripheral Aβ sensory afferents implies that stimulation of other structures related to these fibers (peripheral nerves, DRG, dorsal roots) may also induce FAST. The sub-perception nature of FAST implies that the necessary nerve activation (e.g., evoked neural activities capable of achieving the desired therapeutic effect) is small and potentially below levels needed for an evoked potential. In contrast, existing sub-perception SCS attempts to keep the evoked neural activities above a threshold, with the assumption that such evoked neural activities elicited by single stimulation pulses are large enough for detection. The present inventors have recognized an unmet need for apparatus and methods for close-loop control of electrostimulation while at the same time effectively and reliably detecting small evoked neural activities, and enabling the stimulation to be maintained a level at or below the evoked neural threshold or at a substantially small level such as specified by the user.

Various examples discussed in this document may improve the efficacy of sub-perception SCS stimulation. In accordance with various examples described herein, systems and methods are provided to detect evoked neural activities characterized by exceptionally small amplitude or signal power (e.g., below a single-pulse signal-to-noise ratio). In response to a detection of evoked neural activity, electrostimulation can be controllably adjusted via a feedback-control mechanism, such by reducing one or more waveform dosing parameters, to avoid eliciting a detectable evoked neural activity, or to maintain the evoked neural activity at or below a threshold level. With the closed-loop stimulation control as disclosed in this document, more reliable paresthesia-free effects and improved patient outcome can be achieved without comprising the therapeutic effects of sub-perception electrostimulation, the power consumption can be reduced and device battery life can be extended, and an overall system cost savings may be realized.

Example 1 is a system for providing electrostimulation to a patient, the system comprising: an electrostimulator configured to provide a stimulation pulse train to a neural target of the patient in accordance with one or more stimulation parameters, the stimulation pulse train comprising a plurality of pulses; a sensing circuit configured to sense, during a stimulation surveillance phase, respective evoked responses to the plurality of pulses in the stimulation pulse train; a user interface configured to receive a user input to program the electrostimulator; and a controller configured to: detect an evoked neural activity from the sensed respective evoked responses; in response to the evoked neural activity satisfying a detection criterion, recursively adjust the one or more stimulation parameters, deliver a modified stimulation pulse train in accordance with the recursively adjusted one or more stimulation parameters, and re-detect an evoked neural activity from respective evoked responses to the modified stimulation pulse train, until the re-detected evoked neural activity fails to satisfy the detection criterion; and generate a control signal to the electrostimulator to provide electrostimulation in accordance with the recursively adjusted one or more stimulation parameters.

In Example 2, the subject matter of Example 1 optionally includes, wherein to recursively adjust the one or more stimulation parameters, the controller is configured to recursively reduce stimulation dosing until the re-detected evoked neural activity fails to satisfy the detection criterion, wherein reducing stimulation dosing includes reducing one or more of simulation amplitude, pulse width, or pulse rate, or adjusting a pulse pattern.

In Example 3, the subject matter of any one or more of Examples 1-2 optionally includes the controller that can be configured to: determine one or more reference stimulation levels each corresponding to respective evoked neural activity detectabilities or patient perception of stimulation; receive from the user interface a target stimulation level relative to the one or more reference stimulation levels; and adjust the one or more stimulation parameters to achieve the target stimulation level.

In Example 4, the subject matter of Example 3 optionally includes the target stimulation level between (i) a first reference stimulation level corresponding to evoked neural activities detectable from an averaged evoked response over a specified number of evoked responses to respective pulses in a stimulation pulse train and (ii) a second reference stimulation level corresponding to evoked neural activities detectable from each of a plurality of evoked responses to respective pulses in a stimulation pulse train.

In Example 5, the subject matter of any one or more of Examples 3-4 optionally includes the target stimulation level that can be an adjustable percentage of one of the reference stimulation levels including: a first reference stimulation level corresponding to evoked neural activities detectable from an averaged evoked response over a specified number of evoked responses to respective pulses in a stimulation pulse train; a second reference stimulation level corresponding to evoked neural activities detectable from each of a plurality of evoked responses to respective pulses in a stimulation pulse train; a patient perception threshold; or a patient discomfort threshold.

In Example 6, the subject matter of any one or more of Examples 3-5 optionally includes the controller circuit that can be configured to adjust the one or more stimulation parameters at an adjustable parameter update frequency or an adjustable parameter value change rate.

In Example 7, the subject matter of any one or more of Examples 1-6 optionally includes the sensing circuit that can be configured to sense the respective evoked responses during a pre-scheduled stimulation surveillance phase or an event-triggered stimulation surveillance phase.

In Example 8, the subject matter of any one or more of Examples 1-7 optionally includes the user interface that can be configured to receive a user input of surveillance scheduling and configuration, and wherein in the sensing circuit is configured to sense the respective evoked responses in accordance with the surveillance scheduling and configuration.

In Example 9, the subject matter of Example 8 optionally includes the surveillance scheduling and configuration that can include: timing and duration of the stimulation surveillance phase; a surveillance mode including a constant surveillance or event-triggered surveillance; a waveform phase; or a maximum pulse count in the stimulation pulse train.

In Example 10, the subject matter of Example 9 optionally includes the maximum pulse count that can be determined dynamically based on a noise level of an averaged evoked response generated by averaging evoked responses to respective stimulation pulses in the stimulation pulse train.

In Example 11, the subject matter of any one or more of Examples 1-10 optionally includes, wherein to detect the evoked neural activity from the sensed respective evoked responses, the controller can be configured to: generate a representative evoked response by averaging the respective evoked responses; generate a signal metric and a noise metric from the representative evoked response; and detect a presence or absence of an evoked neural activity based on one or more of the signal metric or the noise metric and a detection criterion.

In Example 12, the subject matter of Example 11 optionally includes the respective evoked responses that can include a plurality of inter-pulse segments of a biopotential signal in response to the stimulation pulse train, the plurality of inter-pulse segments each defined between respective two consecutive pulses of the stimulation pulse train; and the representative evoked response that can include a representative inter-pulse segment generated by averaging the plurality of inter-pulse segments.

In Example 13, the subject matter of any one or more of Examples 11-12 optionally includes, wherein, to detect a presence or absence of an evoked neural activity, the controller can be configured to: generate a relative metric between the signal metric and the noise metric; and detect a presence of an evoked neural activity if the relative metric exceeds a detection threshold, or an absence of an evoked neural activity if the relative metric is below the detection threshold.

In Example 14, the subject matter of any one or more of Examples 11-13 optionally includes, wherein, to detect a presence or absence of an evoked neural activity, the controller can be configured to: in response to the noise metric failing to satisfy a noise criterion, recursively update the representative evoked response using one or more additional evoked responses to one or more additional stimulation pulses until the noise metric satisfies the noise criterion; and in response to the noise metric satisfying the noise criterion, generate the signal metric and the noise metric from the recursively updated representative evoked response.

In Example 15, the subject matter of any one or more of Examples 11-14 optionally includes, wherein, to detect a presence or absence of an evoked neural activity, the controller can be configured to: count a number of the respective evoked response being averaged to generate the representative evoked response; in response to (i) the one or more of the signal metric or the noise metric failing to satisfy the detection criterion and (ii) the counted number being no greater than a threshold count, recursively update the representative evoked response using one or more additional evoked responses to one or more additional stimulation pulses, and generate the signal metric and the noise metric in the recursively updated representative evoked response; detect a presence of an evoked neural activity if (i) one or more of the signal metric or the noise metric satisfies the detection criterion and (ii) the counted number is no greater than the threshold count; and detect an absence of an evoked neural activity if (i) one or more of the signal metric or the noise metric fails to satisfy the detection criterion and (ii) the counted number exceeds the threshold count.

Example 16 is a method for detecting an evoked neural activity in response to a stimulation pulse train delivered to a neural target of a patient. The method comprises steps of: sensing respective evoked responses to a plurality of pulses in the stimulation pulse train during a stimulation surveillance phase; generating a representative evoked response by averaging the respective evoked responses; generating a signal metric and a noise metric from the representative evoked response; and detecting a presence or absence of an evoked neural activity based on (i) one or more of the signal metric or the noise metric and (ii) a detection criterion.

In Example 17, the subject matter of Example 16 optionally includes the respective evoked responses that can include a plurality of inter-pulse segments of a biopotential signal in response to the stimulation pulse train, the plurality of inter-pulse segments each defined between respective two consecutive pulses of the stimulation pulse train; and the representative evoked response that can include a representative inter-pulse segment generated by averaging the plurality of inter-pulse segments.

In Example 18, the subject matter of any one or more of Examples 16-17 optionally includes detecting the presence or absence of an evoked neural activity that can include: generating a relative metric between the signal metric and the noise metric; and detecting a presence of an evoked neural activity if the relative metric exceeds a detection threshold, or an absence of an evoked neural activity if the relative metric is below the detection threshold.

In Example 19, the subject matter of Example 18 optionally includes the relative metric that can include a signal to noise ratio (SNR) between the signal metric and the noise metric, and the detection threshold includes an SNR threshold.

In Example 20, the subject matter of any one or more of Examples 18-19 optionally includes the stimulation pulse train that can be delivered in accordance with a stimulation program comprising specific stimulation waveform and pattern and a pre-determined SNR threshold.

In Example 21, the subject matter of any one or more of Examples 16-20 optionally includes generating the representative evoked response that can include averaging a user-specified number of evoked responses.

In Example 22, the subject matter of any one or more of Examples 16-21 optionally includes detecting a presence or absence of an evoked neural activity that can include: in response to the noise metric failing to satisfy a noise criterion, recursively updating the representative evoked response using one or more additional evoked responses to one or more additional stimulation pulses until the noise metric satisfies the noise criterion; and in response to the noise metric satisfying the noise criterion, generating the signal metric and the noise metric from the recursively updated representative evoked response.

In Example 23, the subject matter of any one or more of Examples 16-22 optionally includes counting a number of the respective evoked response being averaged to generate the representative evoked response, wherein detecting the presence or absence of an evoked neural activity is further based on the counted number of the respective evoked response relative to a threshold count.

In Example 24, the subject matter of Example 23 optionally includes detecting a presence or absence of an evoked neural activity that can include: in response to (i) the one or more of the signal metric or the noise metric failing to satisfy the detection criterion and (ii) the counted number being no greater than the threshold count, recursively updating the representative evoked response using one or more additional evoked responses to one or more additional stimulation pulses, and generating the signal metric and the noise metric in the recursively updated representative evoked response; detecting a presence of an evoked neural activity if (i) one or more of the signal metric or the noise metric satisfies the detection criterion and (ii) the counted number is no greater than the threshold count; and detecting an absence of an evoked neural activity if (i) one or more of the signal metric or the noise metric fails to satisfy the detection criterion and (ii) the counted number exceeds the threshold count.

In Example 25, the subject matter of any one or more of Examples 16-24 optionally includes the noise metric that can include at least one of a root-mean-squared (RMS) value or a peak-to-peak value of a portion of the representative evoked response within a noise detection window.

In Example 26, the subject matter of any one or more of Examples 16-25 optionally includes generating the signal metric that can include detecting a characteristic waveform pattern from an evoked neural activity detection window in the representative evoked response, wherein the signal metric includes at least one of a peak-to-peak value, an area under the curve (AUC), or a width of the detected characteristic waveform pattern.

In this document, the "evoked neural activity" refers to neural activation elicited by stimulation pulses, such as an evoked potential or evoked compound action potential (ECAP). The evoked neural activity can be sensed from one or more neural structures or body parts from which neural responses (e.g., a bipotential signal) can be sensed and recorded. Although various examples described herein are specific to dorsal column evoked potentials, the evoked neural activity may correspond to other neural structures including, for example, peripheral nerves, dorsal roots, among other neural structures. In some examples, the evoked neural activity may include somatosensory evoked potentials (SSEP) recorded by electrodes placed on patient scalp over the sensory area of the brain in response to stimulation of specific nerves in, for example, ankle, wrist, or other external body parts.

The description that follows will generally focus on the use of the invention within a Spinal Cord Stimulation (SCS) systems. However, the present invention may find applicability with any implantable neurostimulator device system, including DBS system, Vagus Nerve Stimulation (VNS) system, Sacral Nerve Stimulation (SNS) systems, and the like. For example, apparatus and methods for detecting (and maintaining) exceptionally small evoked neural activities as described herein can be used to detect evoked neural activities in closed-loop DBS therapy, or therapees of other regions of the nervous system. The following examples illustrate various aspects of the examples described herein.

This Summary is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

BRIEF DESCRIPTION OF THE DRAWINGS

Various examples are illustrated by way of example in the figures of the accompanying drawings. Such examples are demonstrative and not intended to be exhaustive or exclusive examples of the present subject matter.

FIG. 1 illustrates, by way of example and not limitation, an Implantable Pulse Generator (IPG) useable for Spinal Cord Stimulation (SCS).

FIG. 2 illustrates, by way of example and not limitation, an example of stimulation pulses producible by an IPG.

FIG. 3 illustrates, by way of example and not limitation, use of an External Trial Stimulator (ETS) useable to provide stimulation before implantation of an IPG.

DETAILED DESCRIPTION

Figure 4:
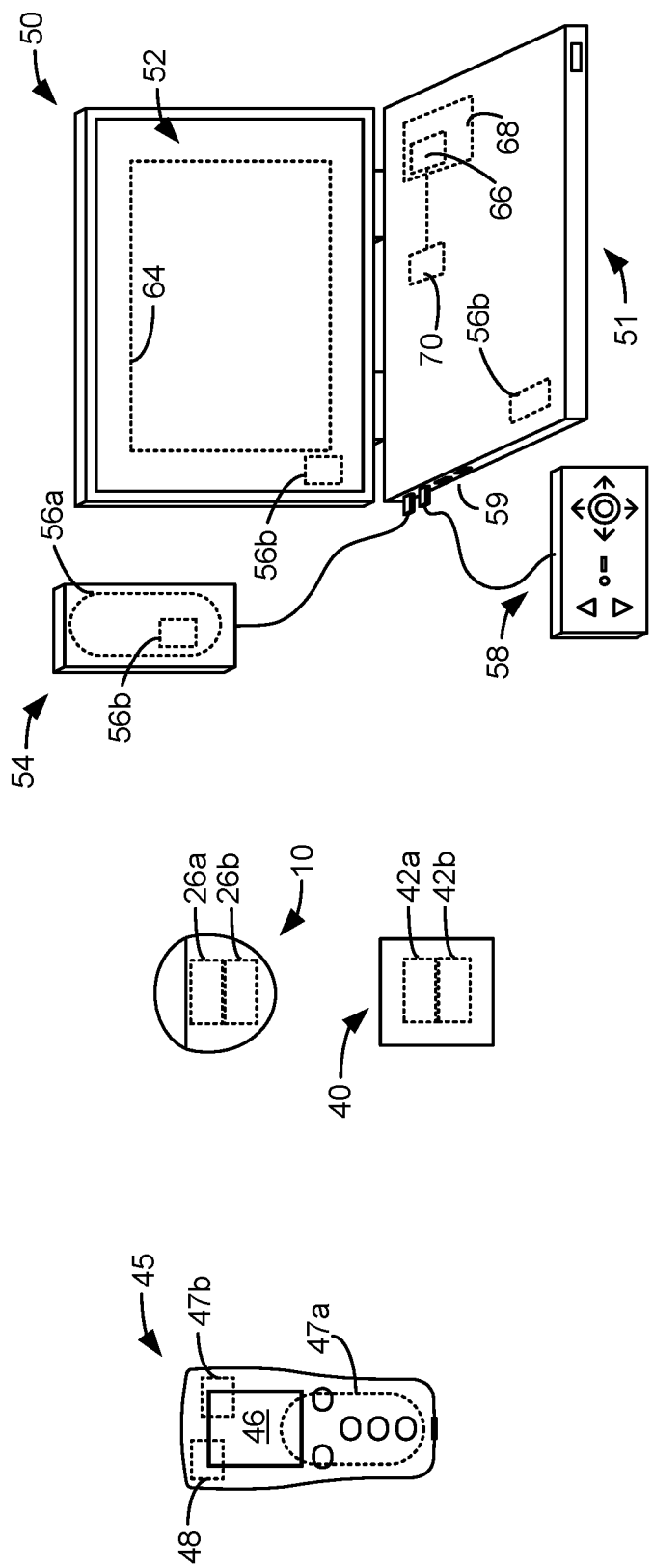
FIG. 4 illustrates, by way of example and not limitation, various external devices capable of communicating with and programming stimulation in an IPG and ETS.

This document describes systems and methods for closed-loop control of electrostimulation while avoiding or maintaining a substantially low level of evoked neural activity.

According to an example, a system comprises an electro-stimulator to deliver a stimulation pulse train, a sensing circuit to sense evoked responses to respective pulses in the pulse train, and a controller to detect an evoked neural activity from an averaged evoked response by averaging evoked responses to respective pulses. The averaging can be controlled by a noise level of the averaged evoked response, or by a count of epochs (pulses) being used for averaging. Responsive to the evoked neural activity satisfying a detection criterion, the controller can recursively adjust stimulation parameters until the detection criterion is no longer satisfied. The electrostimulator can deliver electrostimulation according to the recursively adjusted stimulation parameters.

Various examples described herein involve deep brain stimulation (DBS). The following detailed description of the present subject matter refers to the accompanying drawings which show, by way of illustration, specific aspects and examples in which the present subject matter may be practiced. These examples are described in sufficient detail to enable those skilled in the art to practice the present subject matter. Other examples may be utilized and structural, logical, and electrical changes may be made without departing from the scope of the present subject matter. References to "an", "one", or "various" examples in this disclosure are not necessarily to the same example, and such references contemplate more than one example. The following detailed description is, therefore, not to be taken in a limiting sense, and the scope is defined only by the appended claims, along with the full scope of legal equivalents to which such claims are entitled.

FIG. 1 illustrates, by way of example and not limitation, an Implantable Pulse Generator (IPG) 10 useable for Spinal Cord Stimulation (SCS). The IPG 10 includes a biocompatible device case 12 that holds the circuitry and battery 14 necessary for the IPG to function. The IPG 10 is coupled to electrodes 16 via one or more electrode leads 15 that form an electrode array 17. The electrodes 16 are configured to contact a patient's tissue and are carried on a flexible body 18, which also houses the individual lead wires 20 coupled to each electrode 16. The lead wires 20 are also coupled to proximal contacts 22, which are insertable into lead connectors 24 fixed in a header 23 on the IPG 10, which header can comprise an epoxy for example. Once inserted, the proximal contacts 22 connect to header contacts within the lead connectors 24, which are in turn coupled by feedthrough pins through a case feedthrough to circuitry within the case 12, although these details aren't shown.

By way of example and not limitation, in the illustrated IPG 10, there are sixteen lead electrodes (E1-E16) split between two leads 15, with the header 23 containing a 2×1 array of lead connectors 24. However, the number of leads and electrodes in an IPG is application specific and therefore can vary. The conductive case 12 can also comprise an electrode (Ec). In a SCS application, the electrode leads 15 are typically implanted proximate to the dura in a patient's spinal column on the right and left sides of the spinal cord midline. The proximal contacts 22 are tunneled through the patient's tissue to a distant location such as the buttocks where the IPG case 12 is implanted, at which point they are coupled to the lead connectors 24. In other IPG examples designed for implantation directly at a site requiring stimulation, the IPG can be lead-less, having electrodes 16 instead appearing on the body of the IPG for contacting the patient's tissue. The IPG leads 15 can be integrated with and permanently connected the case 12 in other IPG solutions. The goal of SCS therapy is to provide electrical stimulation from the electrodes 16 to alleviate a patient's symptoms, most notably chronic back pain.

The IPG 10 can include an antenna 26a allowing it to communicate bi-directionally with a number of external devices, as shown in FIG. 4. The antenna 26a as depicted in FIG. 1 is shown as a conductive coil within the case 12, although the coil antenna 26a can also appear in the header 23. When antenna 26a is configured as a coil, communication with external devices preferably occurs using near-field magnetic induction. IPG may also include a Radio-Frequency (RF) antenna 26b. In FIG. 1, RF antenna 26b is shown within the header 23, but it may also be within the case 12. RF antenna 26b may comprise a patch, slot, or wire, and may operate as a monopole or dipole. RF antenna 26b preferably communicates using far-field electromagnetic waves. RF antenna 26b may operate in accordance with any number of known RF communication standards, such as Bluetooth, Zigbee, WiFi, MICS, and the like.

Stimulation in the IPG 10 is typically provided by pulses, as shown in FIG. 2. Stimulation parameters typically include the amplitude of the pulses (A; whether current or voltage); the frequency (F) and pulse width (PW) of the pulses; the electrodes 16 (E) activated to provide such stimulation; and the polarity (P) of such active electrodes, i.e., whether active electrodes are to act as anodes (that source current to the tissue) or cathodes (that sink current from the tissue). These stimulation parameters taken together comprise a stimulation program that the IPG 10 can execute to provide therapeutic stimulation to a patient.

FIG. 2 illustrates, by way of example and not limitation, an example of stimulation pulses producible by an IPG, such as the IPG 10. In this example, the electrode E5 has been selected as an anode, and thus provides pulses which source a positive current of amplitude +A to the tissue. Electrode E4 has been selected as a cathode, and thus provides pulses which sink a corresponding negative current of amplitude −A from the tissue. This is an example of bipolar stimulation, in which only two lead-based electrodes are used to provide stimulation to the tissue (one anode, one cathode). However, more than one electrode may act as an anode at a given time, and more than one electrode may act as a cathode at a given time (e.g., tripolar stimulation, quadripolar stimulation, etc.).

The pulses as shown in FIG. 2 are biphasic, comprising a first phase 30a, followed quickly thereafter by a second phase 30b of opposite polarity. As is known, use of a biphasic pulse is useful in active charge recovery. For example, each electrodes' current path to the tissue may include a serially-connected DC-blocking capacitor, see, e.g., U.S. Patent Application Publication 2016/0144183, which will charge during the first phase 30a and discharged (be recovered) during the second phase 30b. In the example shown, the first and second phases 30a and 30b have the same duration and amplitude (although opposite polarities), which ensures the same amount of charge during both phases. In some examples, the second phase 30b may be charged balance with the first phase 30a if the integral of the amplitude and durations of the two phases are equal in magnitude. The width of each pulse, PW, is defined here as the duration of first pulse phase 30a, although pulse width could also refer to the total duration of the first and second pulse phases 30a and 30b as well. Note that an interphase period during which no stimulation is provided may be provided between the two phases 30a and 30b.

The IPG 10 includes stimulation circuitry 28 that can be programmed to produce the stimulation pulses at the electrodes as defined by the stimulation program. Stimulation circuitry 28 can for example comprise the circuitry described in U.S. Patent Application Publications 2018/0071513 and 2018/0071520, or in U.S. Pat. Nos. 8,606,362 and 8,620,436. The entirety of such references are incorporated herein by reference.

FIG. 3 illustrates, by way of example and not limitation, use of an External Trial Stimulator (ETS) 40 useable to provide stimulation, and at least a portion of external trial stimulation environment that may precede implantation of an IPG 10 in a patient. During external trial stimulation, stimulation can be tried on a prospective implant patient without going so far as to implant the IPG 10. Instead, one or more trial leads 15' are implanted in the patient's tissue 32 at a target location 34, such as within the spinal column as explained earlier. The proximal ends of the trial lead(s) 15' exit an incision 36 and are connected to an External Trial Stimulator (ETS) 40. The ETS 40 generally mimics operation of the IPG 10, and thus can provide stimulation pulses to the patient's tissue as explained above. See, e.g., 9,259,574, disclosing a design for an ETS. The ETS 40 is generally worn externally by the patient for a short while (e.g., two weeks), which allows the patient and his clinician to experiment with different stimulation parameters to try and find a stimulation program that alleviates the patient's symptoms (e.g., pain). If external trial stimulation proves successful, trial lead(s) 15' are explanted, and a full IPG 10 and lead(s) 15 are implanted as described above; if unsuccessful, the trial lead(s) 15' are simply explanted.

Like the IPG 10, the ETS 40 can include one or more antennas to enable bi-directional communications with external devices, explained further with respect to FIG. 4. Such antennas can include a near-field magnetic-induction coil antenna 42a, and/or a far-field RF antenna 42b, as described earlier. ETS 40 may also include stimulation circuitry 44 able to form the stimulation pulses in accordance with a stimulation program, which circuitry may be similar to or comprise the same stimulation circuitry 28 present in the IPG 10. ETS 40 may also include a battery (not shown) for operational power.

FIG. 4 illustrates, by way of example and not limitation, various external devices capable of communicating with and programming stimulation in the IPG 10 and the ETS 40, including a patient, hand-held external controller 45, and a clinician programmer (CP) 50. Both of devices 45 and 50 can be used to send a stimulation program to the IPG 10 or ETS 40—that is, to program their stimulation circuitries 28 and 44 to produce pulses with a desired shape and timing described earlier. Both devices 45 and 50 may also be used to adjust one or more stimulation parameters of a stimulation program that the IPG 10 or ETS 40 is currently executing. Devices 45 and 50 may also receive information from the IPG 10 or ETS 40, such as various status information, etc.

External controller 45 can be as described in U.S. Patent Application Publication 2015/0080982 for example, and may comprise either a dedicated controller configured to work with the IPG 10. External controller 45 may also comprise a general purpose mobile electronics device such as a mobile phone which has been programmed with a Medical Device Application (MDA) allowing it to work as a wireless controller for the IPG 10 or ETS 40, as described in U.S. Patent Application Publication 2015/0231402. External controller 45 includes a user interface, including means for entering commands (e.g., buttons or icons) and a display 46. The external controller 45's user interface enables a patient to adjust stimulation parameters, although it may have limited functionality when compared to the more-powerful clinician programmer 50.

In some examples, the external controller 45 can have one or more antennas capable of communicating with the IPG 10 and ETS 40. For example, the external controller 45 can have a near-field magnetic-induction coil antenna 47a capable of wirelessly communicating with the coil antenna 26a or 42a in the IPG 10 or ETS 40. The external controller 45 can also have a far-field RF antenna 47b capable of wirelessly communicating with the RF antenna 26b or 42b in the IPG 10 or ETS 40.

In some examples, the external controller 45 can have control circuitry 48 such as a microprocessor, microcomputer, an FPGA, other digital logic structures, etc., which is capable of executing instructions an electronic device. Control circuitry 48 can for example receive patient adjustments to stimulation parameters, and create a stimulation program to be wirelessly transmitted to the IPG 10 or ETS 40.

Clinician programmer 50 is described further in U.S. Patent Application Publication 2015/0360038, and is only briefly explained here. The clinician programmer 50 can comprise a computing device 51, such as a desktop, laptop, or notebook computer, a tablet, a mobile smart phone, a Personal Data Assistant (PDA)-type mobile computing device, etc. In FIG. 4, computing device 51 is shown as a laptop computer that includes typical computer user interface means such as a screen 52, a mouse, a keyboard, speakers, a stylus, a printer, etc., not all of which are shown for convenience. Also shown in FIG. 4 are accessory devices for the clinician programmer 50 that are usually specific to its operation as a stimulation controller, such as a communication "wand" 54, and a joystick 58, which are coupleable to suitable ports on the computing device 51, such as USB ports 59 for example.

The antenna used in the clinician programmer 50 to communicate with the IPG 10 or ETS 40 can depend on the type of antennas included in those devices. If the patient's IPG 10 or ETS 40 includes a coil antenna 26a or 42a, wand 54 can likewise include a coil antenna 56a to establish near-filed magnetic-induction communications at small distances. In this instance, the wand 54 may be affixed in close proximity to the patient, such as by placing the wand 54 in a belt or holster wearable by the patient and proximate to the patient's IPG 10 or ETS 40.

In an example where the IPG 10 or ETS 40 includes an RF antenna 26b or 42b, the wand 54, the computing device 51, or both, can likewise include an RF antenna 56b to establish communication with the IPG 10 or ETS 40 at larger distances. (Wand 54 may not be necessary in this circumstance). The clinician programmer 50 can also establish communication with other devices and networks, such as the Internet, either wirelessly or via a wired link provided at an Ethernet or network port.

To program stimulation programs or parameters for the IPG 10 or ETS 40, the clinician interfaces with a clinician programmer graphical user interface (GUI) 64 provided on the display 52 of the computing device 51. As one skilled in the art understands, the GUI 64 can be rendered by execution of clinician programmer software 66 on the computing device 51, which software may be stored in the device's non-volatile memory 68. One skilled in the art will additionally recognize that execution of the clinician programmer software 66 in the computing device 51 can be facilitated by control circuitry 70 such as a microprocessor, microcomputer, an FPGA, other digital logic structures, etc., which is capable of executing programs in a computing device. The control circuitry 70 can execute the clinician programmer software 66 to generated a therapy plan and rendering the GUI 64. The therapy plan may include stimulation parameters chosen through the GUI 64 (e.g., electrode configurations and stimulation dosing parameters). The control circuitry 70 can enable communications via antennas 56a or 56b to communicate the therapy plan (e.g., stimulation parameters) to the patient's IPG 10. The IPG 10 may deliver electrostimulation in accordance with the therapy plan.

In an example, the therapy plan includes a sub-perception SCS plan comprising stimulation parameters with respective values set by the user via the GUI 64. In some examples, the sub-perception SCS plan may include settings and parameters for detecting evoked neural activities from evoked responses to a stimulation pulse train, and for adjusting stimulation parameters so as to avoid or maintain a substantially low level of evoked neural activities while delivering the sub-perception SCS. Examples of the GUI for programming a sub-perception SCS with avoidance or suppression of evoked neural activity are discussed below with reference to FIGS. 8-10 and 11A-11B.

Figure 5:
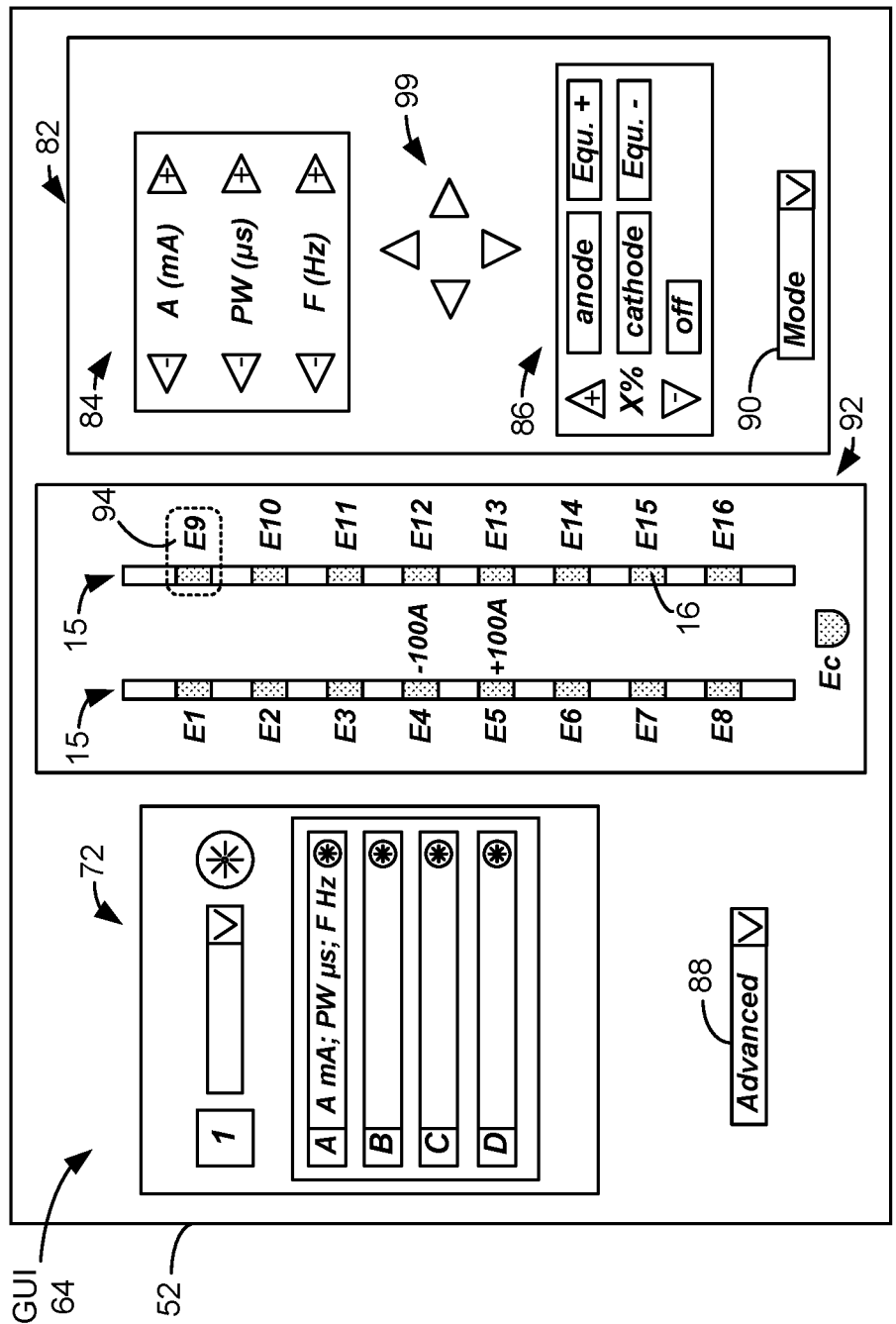
FIG. 5 illustrates, by way of example and not limitation, a Graphical User Interface (GUI) for setting or adjusting stimulation parameters.

FIG. 5 illustrates, by way of example and not limitation, a portion of a GUI (such as one in a clinician programmer) for setting or adjusting stimulation parameters, such as the GUI 64 as shown in FIG. 4. One skilled in the art will understand that the particulars of the GUI 64 will depend on where clinician programmer software 66 is in its execution, which will depend on the GUI selections the clinician has made. FIG. 5 shows the GUI 64 at a point allowing for the setting of stimulation parameters for the patient and for their storage as a stimulation program. To the left a program interface 72 is shown, which as explained further in the '038 Publication allows for naming, loading and saving of stimulation programs for the patient. Shown to the right is a stimulation parameters interface 82, in which specific stimulation parameters (A, D, F, E, P) can be defined for a stimulation program. Values for stimulation parameters relating to the shape of the waveform (A; in this example, current), pulse width (PW), and frequency (F) are shown in a waveform parameter interface 84, including buttons the clinician can use to increase or decrease these values.

Stimulation parameters relating to the electrodes 16 (the electrodes E activated and their polarities P), are made adjustable in an electrode parameter interface 86. Electrode stimulation parameters are also visible and can be manipulated in a leads interface 92 that displays the leads 15 (or 15') in generally their proper position with respect to each other, for example, on the left and right sides of the spinal column. A cursor 94 (or other selection means such as a mouse pointer) can be used to select a particular electrode in the leads interface 92. Buttons in the electrode parameter interface 86 allow the selected electrode (including the case electrode, Ec) to be designated as an anode, a cathode, or off. The electrode parameter interface 86 further allows the relative strength of anodic or cathodic current of the selected electrode to be specified in terms of a percentage, X. This is particularly useful if more than one electrode is to act as an anode or cathode at a given time, as explained in the '038 Publication. In accordance with the example waveforms shown in FIG. 2, as shown in the leads interface 92, electrode E5 has been selected as the only anode to source current, and this electrode receives X=100% of the specified anodic current, +A. Likewise, electrode E4 has been selected as the only cathode to sink current, and this electrode receives X=100% of that cathodic current, −A.

The GUI 64 as shown specifies only a pulse width PW of the first pulse phase 30a. The clinician programmer software 66 that runs and receives input from the GUI 64 will nonetheless ensure that the IPG 10 and ETS 40 are programmed to render the stimulation program as biphasic pulses if biphasic pulses are to be used. For example, the clinician programming software 66 can automatically determine durations and amplitudes for both of the pulse phases 30a and 30b (e.g., each having a duration of PW, and with opposite polarities +A and −A). An advanced menu 88 can also be used (among other things) to define the relative durations and amplitudes of the pulse phases 30a and 30b, and to allow for other more advance modifications, such as setting of a duty cycle (on/off time) for the stimulation pulses, and a ramp-up time over which stimulation reaches its programmed amplitude (A), etc. A mode menu 90 allows the clinician to choose different modes for determining stimulation parameters. For example, as described in the '038 Publication, mode menu 90 can be used to enable electronic trolling, which comprises an automated programming mode that performs current steering along the electrode array by moving the cathode in a bipolar fashion. While GUI 64 is shown as operating in the clinician programmer 50, the user interface of the external controller 45 may provide similar functionality.

Figure 6B:
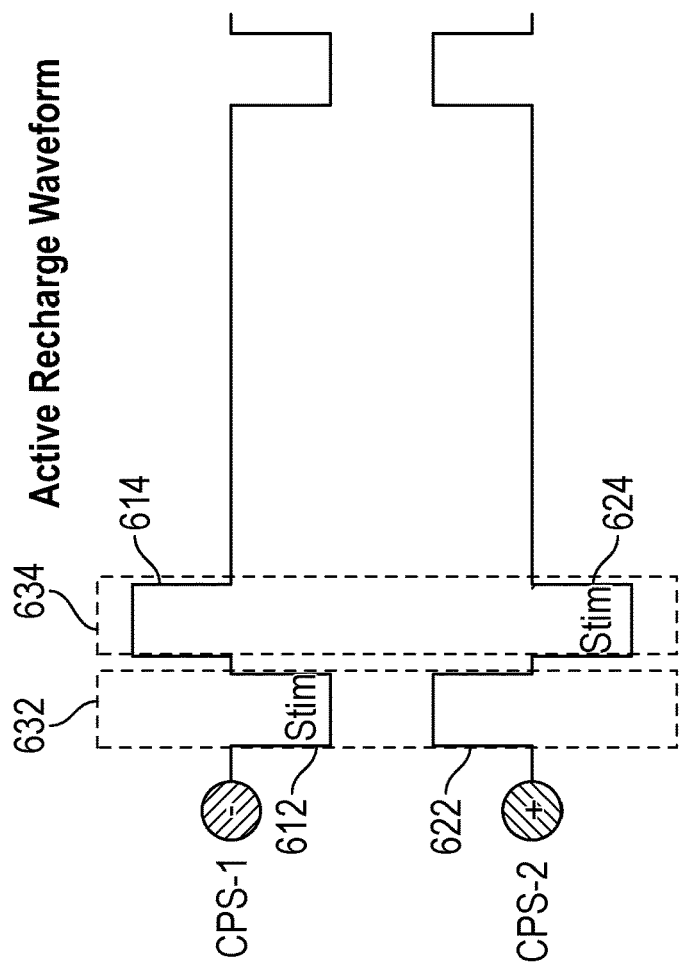
FIGS. 6A-6B illustrate, by way of example and not limitation, schematics of electrode configurations and stimulation waveforms that may be used in Fast-Acting Sub-Perception Therapy (FAST).
Figure 6A:
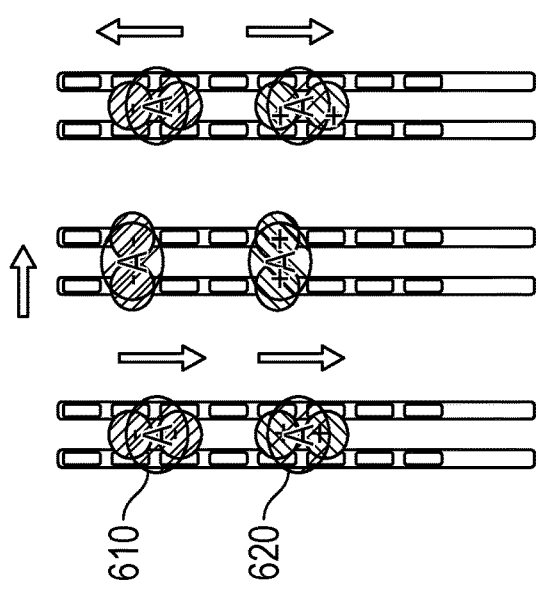

FIGS. 6A-6B illustrate, by way of example and not limitation, schematics of electrode configurations and stimulation waveforms that may be used in Fast-Acting Sub-Perception Therapy (FAST). The FAST can be programmed using a model-based steering algorithm that enables multiple central points of stimulation (CPS) to be moved rostrocaudally and mediolaterally simultaneously at a programmable step set by a user, as illustrated in FIG. 6A. In the illustrated example, by using symmetric biphasic waveforms, two separate CPSs can be implemented in the stimulation paradigm, including CPS-1 610 representing a virtual cathode, and CPS-2 620 representing a virtual anode. CPS-1 610 and CPS-2 620 can respectively sink or source various percentages of total current across multiple electrodes on the lead (also referred to as "current fractionalization"). For example, current applied to the virtual cathode CPS-1 610 can be fractionalized over a plurality of physical cathodes. Similarly, current applied to the virtual anode CPS-2 620 can be fractionalized over a plurality of physician anodes. The bipolar distance between the CPS-1 610 and CPS-2 620 can be programmed to be within a specified range, such as 10-14 mm. In an example, the bipolar distance is set to approximately 12 mm. The bipolar distance controls the spread of paresthesia during neural target search.

FIG. 6B illustrates biphasic symmetric waveforms of stimulation current for the virtual cathode CPS-1 610 and the virtual anode CPS-2 620. The biphasic symmetric waveform comprises a first charge phase 632, followed by a second active recharge (or charge recovery) phase 634. Current amplitude in each phase remains constant, thus a rectangular waveform. For each of the virtual cathode or the virtual anode, current amplitude of the charge phase 632 has the same magnitude but different sign (representing direction of current flow) than the current amplitude of the recharge phase 634. During the first rectangular phase 632, a negative current 612 (i.e., cathodic current) is injected through negatively configured contacts (physical cathodes corresponding to the virtual cathode CPS-1 610), and positive current 622 (i.e., anodic current) is injected through positively configured return contacts (physical anodes corresponding to the virtual anode CPS-2 620). During the second rectangular phase 634, the polarities of the virtual cathode CPS-1 and the virtual anode CPS-2 are reversed to achieve active charge balance: positive current 614 (i.e., anodic current) is applied to the assigned physical cathodes corresponding to virtual cathode CPS-1 610, and negative current 624 (i.e., cathodic current) is applied to the assigned physical anodes corresponding to virtual anode CPS-2 620.

Stimulation dosing parameters, such as amplitude, frequency (or stimulation rate), pulse width (PW), or waveform pattern of the stimulation waveform are programmable and can be set or adjusted by a user on a GUI. In an example, the frequency of the stimulation pulse (reciprocal of period) can be programmed to a value within a specific range, such as approximately 2-1200 Hz. In an example, the stimulation frequency can be programmed to 90 Hz. The pulse width (PW) can be programmed within a range, such as approximately 210±50 micro-seconds (μs). To identify the electrode configuration and fine-tune the location of stimulation, a neural target search can be carried out using the CPS-1 and CPS-2 steered simultaneously in the rostro-caudal and medial-lateral dimensions at a programmable step (resolution) such as in approximately 300 s increments. The stimulation amplitude can then be lowered to a programmable fraction of the perception threshold. Such a programming for FAST allows for a systematic optimization of the stimulating field that provides comprehensive overlap between the area of pain and paresthesia sensation.

Figure 7:
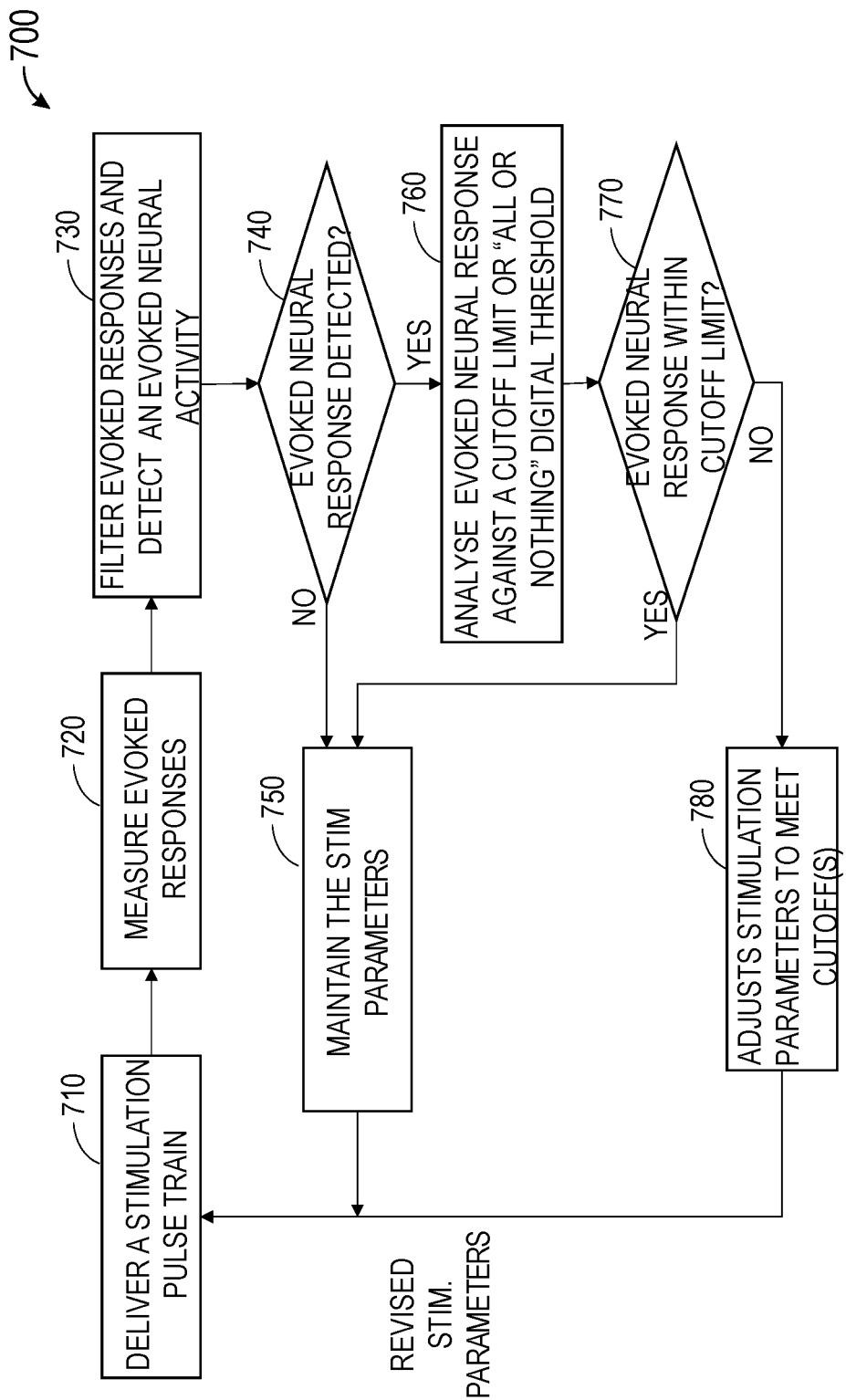
FIG. 7 illustrates, by way of example and not limitation, a schematic diagram illustrating a method for controlling electrostimulation to avoid or suppress detectable evoked neural activities in a patient.

FIG. 7 illustrates, by way of example and not limitation, a schematic diagram illustrating a method 700 for controlling electrostimulation to avoid or suppress detectable evoked neural activities to be at a substantially low level. A closed-loop control mechanism may be used to dynamically adjust one or more stimulation parameters to avoid eliciting a detectable evoked neural activity, or to keep the detectable neural activity to or below a predetermined threshold. Portions of the method 700 may be implemented in and carried out by the IPG 10 in FIG. 1, or an external device such as the ETS 40 or the CP 50 in FIG. 4.

At 710, a stimulation pulse train may be delivered to a neural target in accordance with one or more stimulation parameters. Examples of the stimulation parameters can include stimulation waveform dosing parameters such as amplitude (e.g., current amplitude), pulse width, pulse rate or frequency, pulse pattern, pulse waveform, among others. The stimulation parameters may also include electrode configurations that defines electrodes used for delivering stimulation and fractionalization of current or electrical energy among electrodes. In some examples, a stimulation pulse train may be delivered in accordance with a pre-defined stimulation program, such as the Fast-Acting Sub-Perception Therapy (FAST) as described above with reference to FIGS. 6A-6B. The electrostimulation may be generated by an implantable stimulator such as the IPG 10, and delivered to the neural target via a lead comprising a plurality of electrodes, such as the one or more leads 15. Examples of programming a stimulation pulse train for sub-perception therapy with evoked neural activity avoidance or suppression are discussed below with reference to FIG. 8.

At 720, evoked responses to respective stimulation pulses in the stimulation pulse train can be sensed, such as using a sensing circuit of the IPG 10. The evoked responses can be sensed from one or more of a dorsal column, a dorsal root, or a peripheral nerve. In some examples, the evoked responses can be somatosensory evoked potential (SSEP) signal recorded by electrodes placed on patient scalp over the sensory area of the brain in response to stimulation of specific nerves in, for example, ankle, wrist, or other external body parts. In an example, a biopotential signal can be sensed by one or more subcutaneous electrodes on one of the one or more leads 15 in response to the stimulation pulse train. The biopotential signal can include an evoked potential or evoked compound action potential (ECAP). The evoked responses (corresponding to the stimulation pulses) can include a plurality of inter-pulse segments of a biopotential signal.

The evoked responses can be sensed during a stimulation surveillance phase, represented by a time window following a therapeutic phase. The evoked responses sensed following respective stimulation pulses form a evoked response train. The stimulation surveillance phase can be set or modified by a user using a programming device, such as the external controller 45 or the CP 50. Additionally or alternatively, the stimulation surveillance phase can be event-triggered and automatically set. Examples of programming a stimulation surveillance phase and sensing evoked responses in accordance with a surveillance scheduling and configuration are discussed below with reference to FIG. 9.

At 730, the evoked response train (i.e., the evoked responses to respective stimulation pulses) can be pre-processed, and an evoked neural activity can be detected from the pre-processed evoked responses. The pre-processing can include, among other operations, filtering the evoked responses using a filter of a specific type. By way of example and not limitation, a moving-average filter can be used to filter out or substantially attenuate noise or interferences from the evoked response train. Other low-pass or band-pass filters may also be used.

In an example, filtering the evoked responses may include generating a representative evoked response by averaging a plurality of evoked responses in the evoked response train. In an example where the evoked responses are represented by inter-pulse segments of a bipotential signal responsive to the stimulation pulse train, a representative inter-pulse segment can be generated by averaging a plurality of inter-pulse segments of the biopotential signal. Each inter-pulse segment is defined between respective two consecutive stimulation pulses. In an example, the plurality of inter-pulse segments can be time-aligned with respect to respective leading stimulation pulses before being averaged.

The number of epochs needed (up to a pre-determined device limit) for averaging the evoked responses (e.g., inter-pulse segments of a bio-potential signal) can be programmed to a pre-determined fixed number. Alternatively, the number of epochs can be "float", and determined dynamically based on, for example, most recent averaged evoked response. In an example, the averaging process can continue to update the average evoked response with additional evoked responses until a noise level of the most recent updated averaged evoked response satisfies a condition, such as falling below a noise threshold.

Signal metrics may be generated from the filtered evoked response signal, which may include, for example, signal peak amplitude, signal power, signal to noise ratio, among others. A detection feature can be generated using the signal metrics. Examples the detection feature can include a signal metric detected from a signal detection window, or a relative measure between a signal metric and a noise metric detected from respective detection windows. An example of the relative measure is a signal-to-noise ratio (SNR). The detection feature can be compared to a detection criterion (e.g., a detection threshold) to determine if a detectable evoked neural activity is present or absent from the evoked responses. Examples of detecting the presence or absence of an evoked neural activity are discussed below with reference to FIGS. 10 and 11A-11B.

If it is decided at 740 that no evoked neural activity is detected, the present stimulation is deemed appropriate for sub-perception therapy without eliciting detectable evoked neural activities. The present stimulation parameters are maintained at their respective values at 750, and the stimulation pulse train can be delivered to the neural target 710 in accordance with the present stimulation parameters. However, if an evoked neural activity is detected at 740, then the evoked neural activity can be further analyzed at 760. For example, the evoked neural activity can be compared to a cutoff limit or to a "all or nothing" digital threshold. If at 770 the evoked neural activity falls within the cutoff limit or below the "all or nothing" digital threshold, the evoked neural activity is deemed at a substantially low level. This indicates the present stimulation is providing electrostimulation without eliciting a detectable evoked neural activity. Accordingly, the stimulation parameters can be maintained at their respective existing values at 750, and the stimulation pulse train can be delivered to the neural target 710 in accordance with the present stimulation parameters. If, however, the evoked neural activity goes beyond the cutoff limit or exceeds the "all or nothing" digital threshold at 770, then the evoked neural activity is deemed significant. This may suggest that the present stimulation has an inappropriately or unnecessarily high intensity that may elicit paresthesia. Accordingly, to avoid or suppress the evoked neural activities such as to maintain paresthesia-free or sub-perception electrostimulation, at 780 one or more stimulation parameters may be adjusted to reduce the stimulation energy delivered to the patient. The stimulation pulse train can then be delivered to the neural target 710 in accordance with the adjusted stimulation parameters. The adjustment of stimulation parameter at 780 can be carried out automatically via a feedback control circuit, or at least partially activated in response to a user input, such as a confirmation of the automatically generated recommendation for stimulation parameter adjustment.

Figure 8:
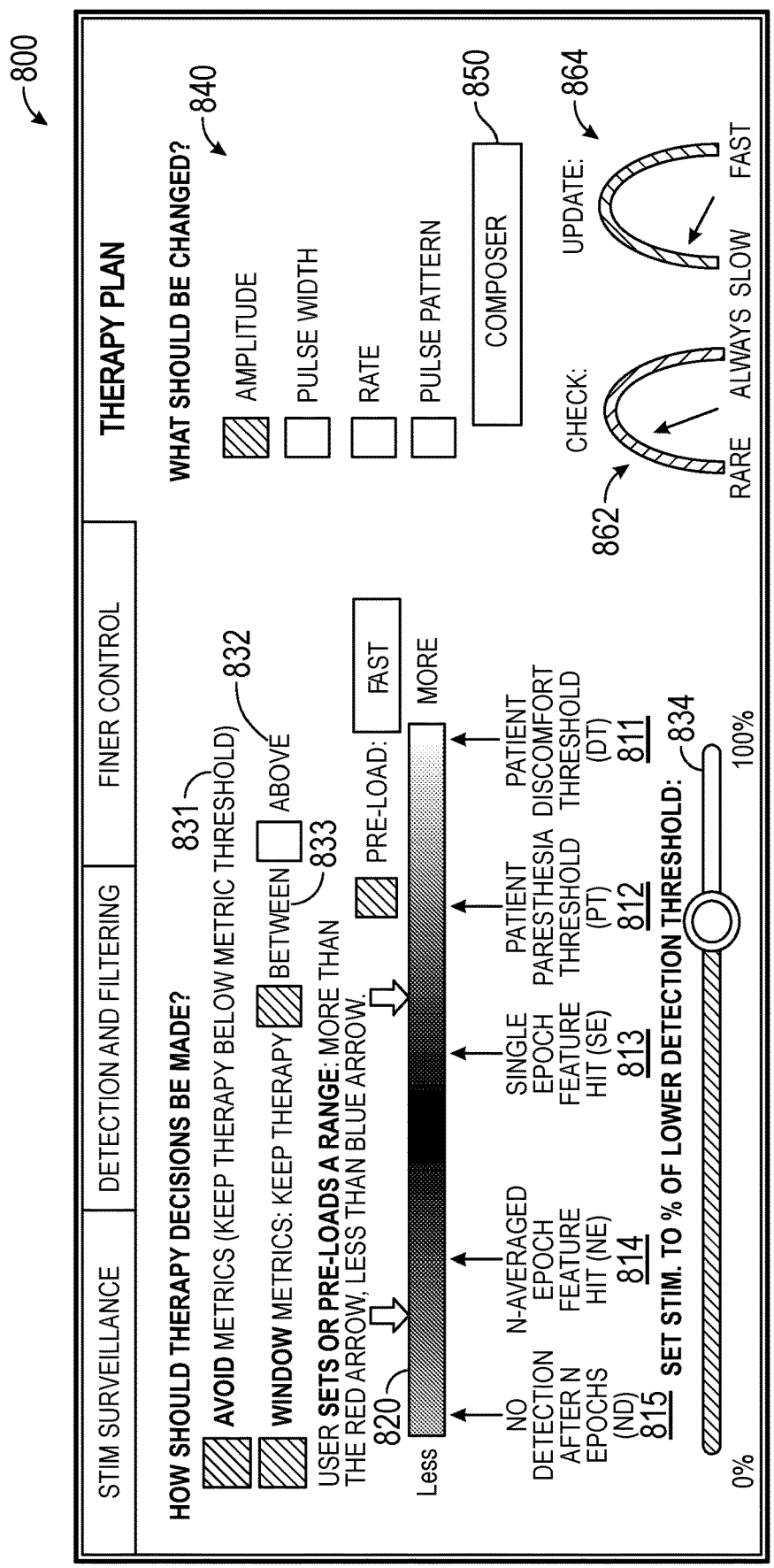
FIG. 8 illustrates, by way of example and not limitation, a GUI for programming an electrostimulation plan with evoked neural activity avoidance or suppression.

FIG. 8 illustrates a GUI 800 for programming a sub-perception electrostimulation with evoked neural activity avoidance or suppression. The GUI 800, which is an example of the GUI 64 of the CP 50, can include user interface (UI) control elements that allow a user to program a therapy plan that defines a target stimulation level (e.g., stimulation current) relative to one or more reference stimulation levels. The reference stimulation levels represents threshold stimulation strengths (e.g., current amplitude) sufficient to produce respective effects on patient perception of stimulation. For example, a discomfort threshold (DT) 811 corresponds to a threshold stimulation level that causes patient discomfort, a perception threshold (PT) 812 corresponds to a threshold stimulation level that elicits perception (paresthesia), a tolerance or comfort level may correspond to a threshold stimulation level that the patient finds to be to tolerable for indefinite or infinite time. The reference stimulation levels may additionally or alternatively represent detectabilities of evoked neural activity (e.g., a likelihood or a pattern of evoked neural activity elicited by stimulation). For example, a "single epoch feature hit" (SE) 813 corresponds to a threshold stimulation level that elicits detectable evoked neural activities for each and every epoch (i.e., stimulation pulse) in a stimulation pulse train. An "N-averaged epoch feature hit" (NE) 814 corresponds to a threshold stimulation level not enough to elicit detectable evoked neural activities in each and every epoch, but an evoked neural activity is detectable from an averaged response over a specified number (N) of epochs. The epoch number N is a user-programmable number. In an example, N can be set to 32. Another reference stimulation level, "no detection after N epochs" (ND) 815, corresponds to a threshold stimulation level incapable of eliciting a detectable evoked neural activity for N epochs of a stimulation train. Because generally less stimulation energy is required to elicit a detectable evoked neural activity in some but not all epochs of a stimulation pulse train, ND 815 is generally lower than NE 814, which is generally lower than SE 813. SE 813 is generally lower than PT 812 and DT 811, The reference stimulation levels, including DT 811, PT 812, SE 813, NE 814, and ND 815, can be plotted along a stimulation strength scale 820. A user can set a target stimulation level relative to one or more reference stimulation levels. In an example, a user may select the "Avoid metrics" option 831 to set the target stimulation level to some value below a reference stimulation level to avoid certain effects corresponding to that reference stimulation level. For example, the target stimulation level can be set to some value lower than PT 812 to avoid paresthesia. In another example, a user may check the "Above metrics" option 832 to set the target stimulation level to above a reference stimulation level to ensure an attainment of certain effects corresponding to that reference stimulation level. For example, the target stimulation level may be set to some value above the NE 814 to ensure that an evoked neural activity can be detected from an averaged response over N epochs. In yet another example, a user may check the "Between metrics" option 833 to set the target stimulation level at some value between two reference stimulation levels, such as between NE 814 and SE 813. In some examples, a user may use a UI control 834 (e.g., a slider) to set the target stimulation level to be a percentage of a reference stimulation level, such as 80% of NE 814, 60% of SE 813, or 50% of PT 814. In some examples, in alternative to manually setting the target stimulation level, a user can select a stimulation program from a list of available programs each including a pre-determined range of stimulation strength (e.g., current amplitude).

The target stimulation level can be reached via one or more stimulation dosing parameters including, for example, amplitude, frequency (or stimulation rate), pulse width (PW), or waveform pattern of the stimulation waveform. A user can identify one or more dosing parameters to be adjusted to obtain the target stimulation level. Additionally, a composer 850 allows a user to specify a pulse pattern, such as an atonic pulse pattern with a constant inter-pulse interval, or a pulse pattern with variable inter-pulse intervals.

In some examples, the GUI 800 can include options that allow a user to adjust one or more stimulation parameters at a user-specified parameter update frequency 862, or at a user-specified parameter value change rate 864. The parameter update frequency 862 can be changed continuously or in discrete steps from "rare" to "always", where "rare" can be a fixed period (e.g. once per week) or implicit (e.g. only when user changes ratings or a user-specified parameter value change rate received from the user interface), and "always" may refer to frequent or real-time update of one or more stimulation parameters. The parameter value change rate 864 represents a slew rate of parameter value update from its present value to the adjusted value, and can be changed continuously or in discrete steps from "slow" to "fast", where "slow" may be over minimum parameter steps allowed in programming settings at slow time rate, and "fast" can be the maximum rate of change.

Figure 9:
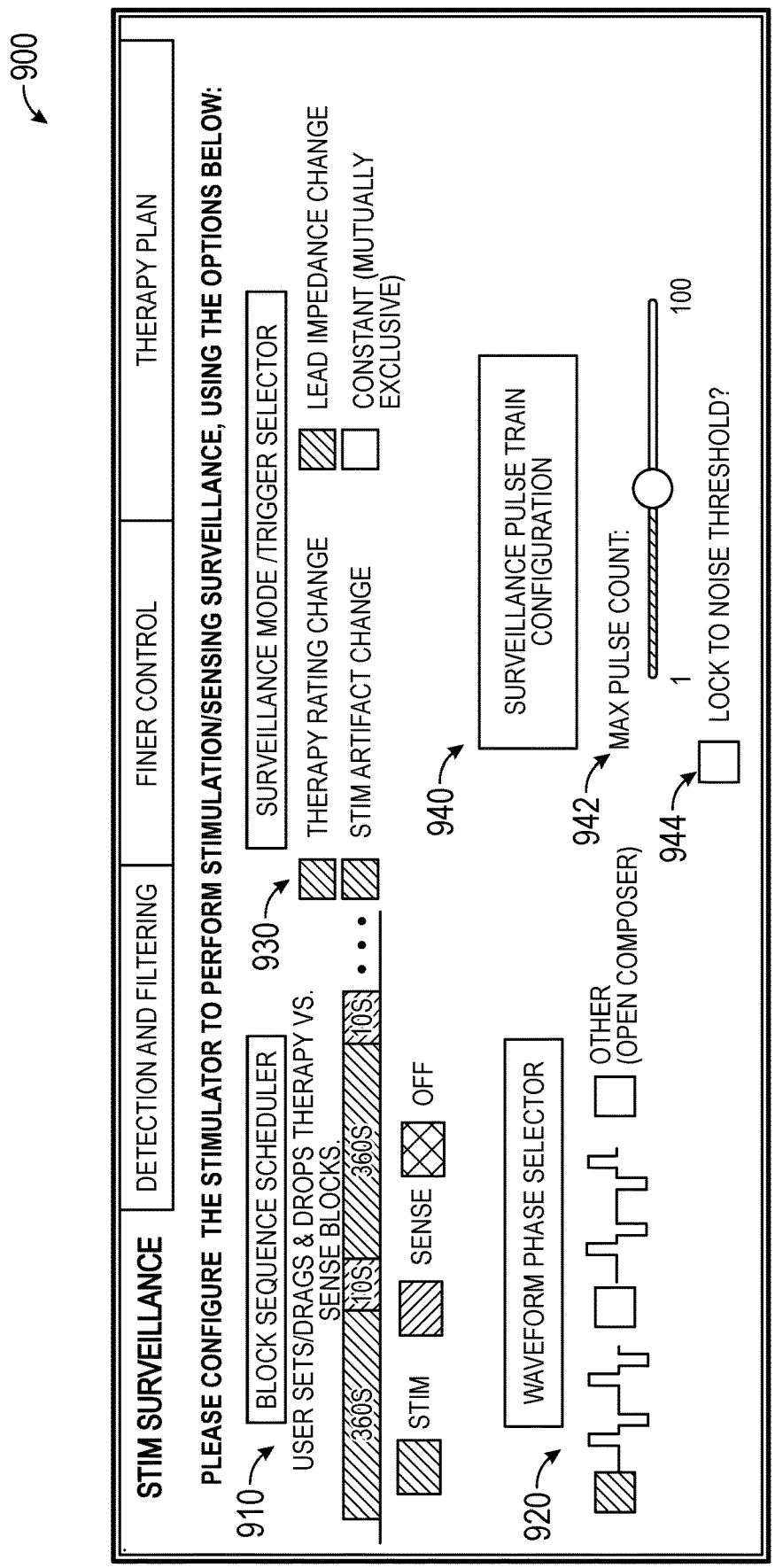
FIG. 9 illustrates, by way of example and not limitation, a GUI for programming a stimulation surveillance phase for detecting evoked neural activities from responses to a stimulation pulse train.

FIG. 9 illustrates a GUI 900 for programming a stimulation surveillance phase for detecting evoked neural activities from responses to a stimulation pulse train. A stimulation pulse train is delivered during the stimulation surveillance phase, and evoked responses to respective pulses in the stimulation pulse train are evaluated to determine if a detectable evoked neural activity (e.g., ECAP) has been elicited by the stimulation pulse train. The stimulation surveillance phase can be pre-scheduled, or alternatively be triggered by a specific event. The GUI 900, which is an example of the GUI 64 of the CP 50, can include UI control elements that allow a user to scheduling and configuring the surveillance phase using one or more programmable or selectable surveillance parameters. Examples of the surveillance parameters include a block sequence scheduler 910 that defines a sequence of surveillance blocks, a waveform phase selector 920, a surveillance mode/trigger selector 930, and a surveillance pulse train configuration 940. The control circuitry 70 of the CP 50 can execute the clinician programmer software 66 to control the IPG 10 to deliver the stimulation pulse train and sense the evoked responses (e.g. bipotential signals) in accordance with the surveillance scheduling and configuration.

The block sequence scheduler 910 allows a user to schedule the stimulation/sensing surveillance by setting relative timings and durations for therapy blocks ("STIM", during which therapeutic electrostimulations are delivered) and sense blocks ("SENSE", during which surveillance sensing and assessment of evoked responses are performed). In some examples, sensing may optionally be turned on or off temporarily during the "STIM" block. The sense blocks and the therapy blocks can have respective programmable durations, and can be interspersed between each other. In the illustrated example, the therapy blocks are 360 seconds long, the sense blocks are 10 seconds long. In an example, the user may use UI control elements to drag and drop one or more of the therapy blocks or the sense blocks to different timing locations, and/or to increase or decrease block sizes (durations) for one or more of the therapy blocks or the sense blocks. In an example, the block sequence scheduler 910 may be represented by a table with clock time intervals, integrated with an existing stimulation program (e.g., FAST). In another example, the block sequence scheduler 910 may pre-load a stored sequence comprising therapy blocks and sense blocks, and the user can then modify the pre-loaded sequency such as by adjusting the timings and/or durations of the therapy blocks or the sense blocks.

The waveform phase selector 920 allows a user to select one of a pre-defined waveform phases for the stimulation pulses used in surveillance. Alternatively, the user may use a composer 850 to define waveform phase or pulse shape. The waveform phase or pulse shape may affect evoked neural activity detection.

The surveillance mode/trigger selector 930 allows a user to set how often, or under what condition, the surveillance stimulation/sensing is performed. One example of the surveillance mode is a constant surveillance, in which the surveillance is performed constantly or periodically according to a pre-determined schedule. Alternatively, the surveillance mode can be one of event-triggered modes, in which the surveillance is activated only responsive to certain events, such as therapy rating change, stimulation artifact change, lead impedance change, among other events.

The surveillance pulse train configuration 940 allows a user to set a maximum pulse count 942 in a stimulation pulse train, such as via a slider or other UI control elements. The maximum pulse count can be set to some value within a range, such as between 1 and 100, as illustrated in FIG. 9. The stimulation pulse train that comprises the maximum count of stimulation pulses can be configured to deliver one or multiple pulses (up to the max count) during the surveillance phase, to be flat or ramped (e.g. from 0% to 100% PT) via a slider, wheel, etc.

In alternative to the fixed maximum pulse count 942, in some example, the maximum pulse count can be set to "Lock to noise threshold" 944, in which case the maximum pulse count is "float" (i.e., not fixed at a programmed value), and can be determined dynamically based on how a noise level (e.g., a root-mean-squared or RMS noise) is suppressed by averaging the evoked responses. For example, if the noise level of an averaged evoked response over N stimulation epochs (pulses) falls below a noise threshold, then the maximum pulse count can be determined to be N.

Figure 10:
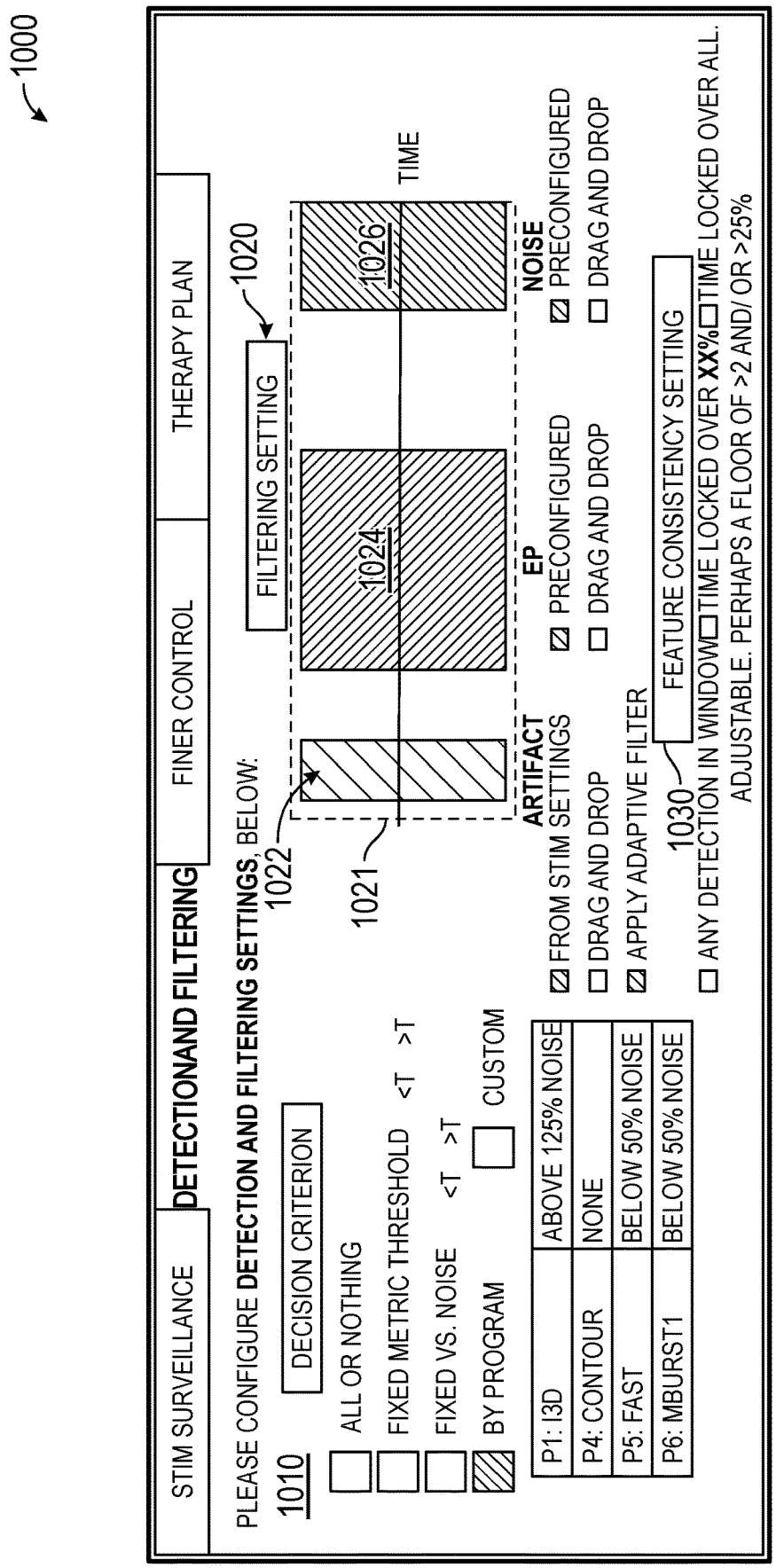
FIG. 10 illustrates, by way of example and not limitation, a GUI for configurating detection criteria and filtering settings for detecting evoked neural activities.
Figure 11A:
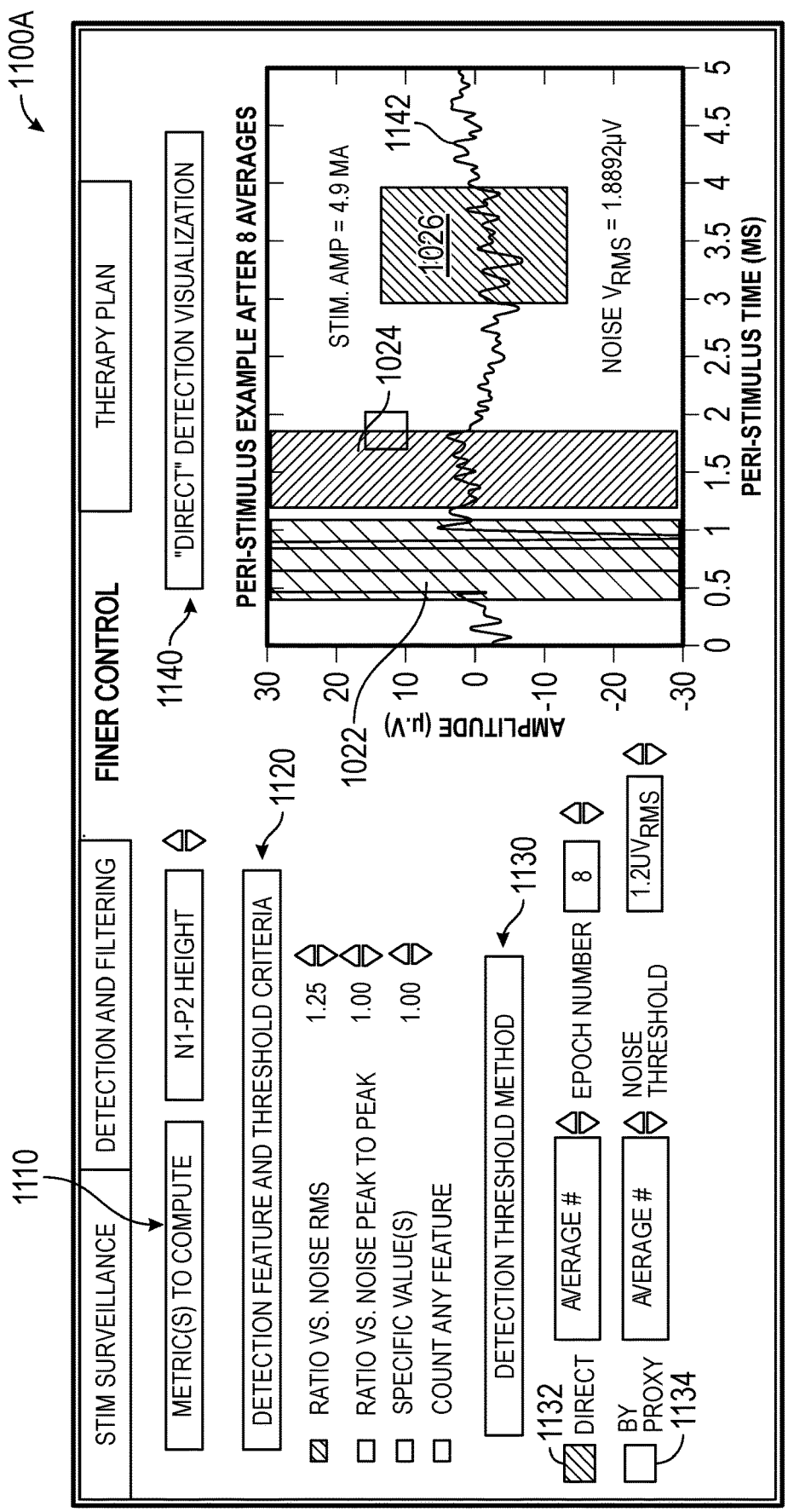
FIGS. 11A-11B illustrates, by way of example and not limitation, GUIs for fine-tuning detection criteria for detecting evoked neural activities from responses to a stimulation pulse train.
Figure 11B:
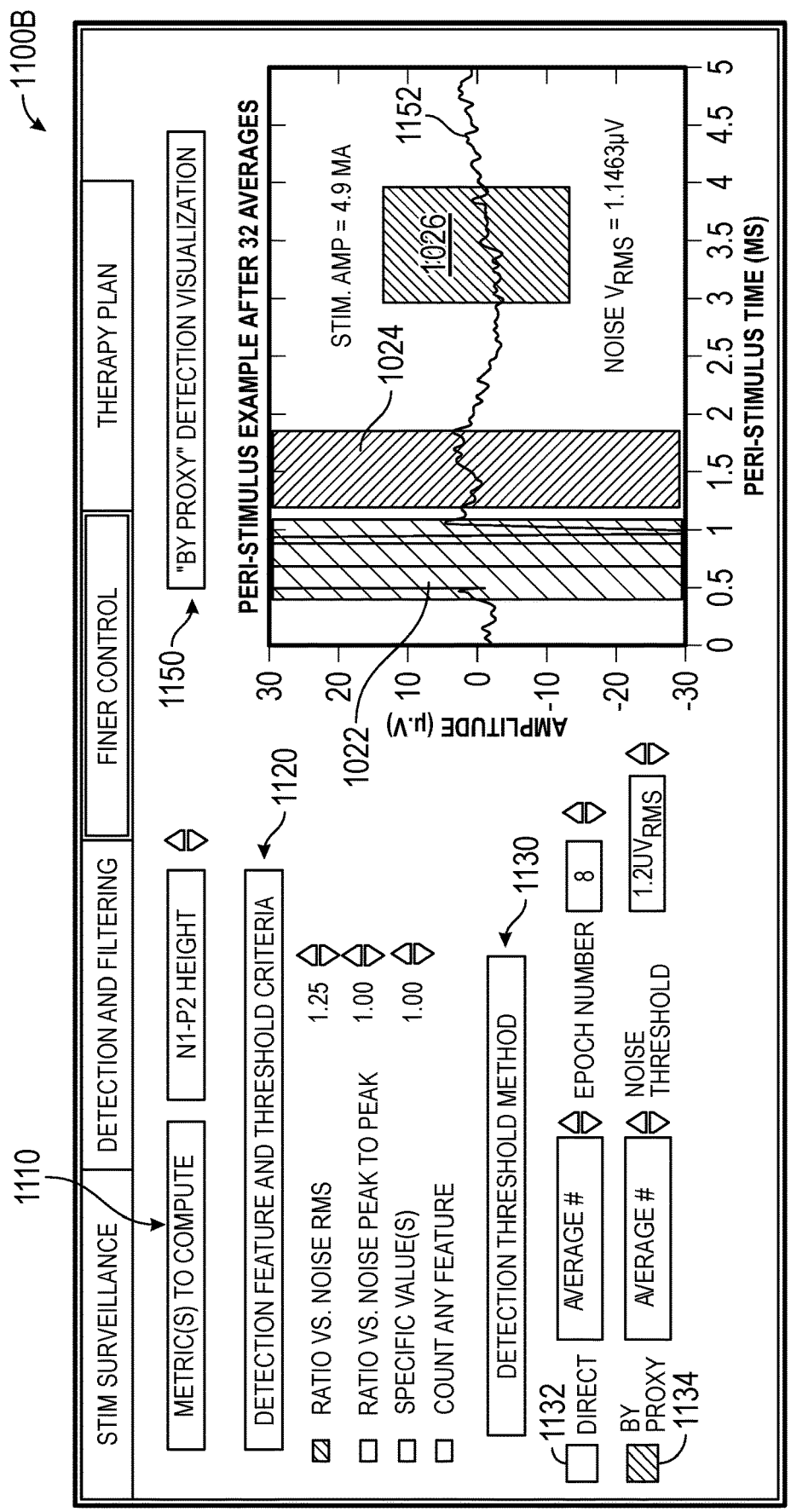

FIGS. 10 and 11A-11B illustrate GUIs for configurating detection settings for detecting a presence or absence of an evoked neural activity in response to a stimulation pulse train during a surveillance phase, and visualizing the detection results, such as in accordance with the steps 730-740 and 760-770 of the method 700. The control circuitry 70 of the CP 50 can execute the clinician programmer software 66 to control the IPG 10 to perform detection of evoked neural activity from the sensed evoked responses (e.g., a biopotential signal) during a surveillance phase, compare the detected evoked neural activity to a programmable criterion indicative of stimulation-induced paresthesia, and in response to the detected evoked neural activity satisfies a programmable criterion, recursively adjust the one or more stimulation parameters until the programmable criterion is no longer satisfied. The IPG 10 can then generate sub-perception electrostimulation in accordance with the adjusted one or more stimulation parameters.

FIG. 10 illustrates a GUI 1000 for configurating detection and filtering settings for detecting evoked neural activities, including a decision criterion 1010, a filtering setting 1020, and a feature consistency setting 1030. The decision criterion 1010 allows a user to select a criterion for detecting the presence or absence of evoked neural activity from the evoked responses in response to the stimulation pulse train. By way of example and not limitation, the selectable detection criteria may include All-Or-Nothing, Fixed Metric Threshold, or Fixed vs. Noise. Under the "All-or-nothing" criterion, a positive detection decision (i.e., the evoked neural activity is deemed present) can be made if any of the pulses in the stimulation pulse train evokes a detectable neural activity. Under the "Fixed metric threshold" criterion, a positive detection decision can be made if an evoked response signal metric ($X_{EP}$), measured or computed from a user-defined evoked neural activity detection window ($W_{EP}$), exceeds a specific threshold ($X_{TH}$). Under the "Fixed vs. Noise" criterion, an evoked response signal metric ($X_{EP}$) can be measured or computed from a user-defined evoked neural activity detection window ($W_{EN}$), and an noise metric ($X_N$) can be measured or computed from a user-defined noise detection window ($W_N$). A positive detection decision can be made based on a comparison of the evoked response signal metric ($X_{EP}$) and the noise metric ($X_N$). In an example, a signal-to-noise ratio (SNR) can be computed using the $X_{EP}$ and $X_N$, and a positive detection decision can be made if the SNR exceeds an SNR threshold ($SNR_{TH}$).

In some examples, the detection decision criterion 1010 can be determined by a stimulation program selected from a selectable list including, for example, I3D, Contour, FAST, or Micro Burst programs, among other programs. The stimulation programs each contain respective pre-defined detection decision criteria. The detection decision criterion can be based on the evoked response signal metric ($X_{EP}$), the noise metric ($X_N$), or a relative metric between $X_{EP}$ and $X_N$, such as a signal-to-noise ratio (SNR).

The filter setting 1020 allows a user to define one or more of an evoked neural activity detection window ($W_{EP}$) 1024, a noise detection window ($W_N$) 1026, or a stimulation artifact window ($W_A$) 1022. Such windows are time intervals defined within an inter-pulse interval between stimulation pulse $P_i$ and $P_{i+1}$, each having respective adjustable temporal locations and window sizes (durations). In the illustrated example, the artifact window $W_A$ 1022 can begin immediately after the stimulation pulse $P_i$ 1021. The neural activity detection window ($W_{EP}$) 1024 can precede in time to the noise detection window ($W_N$) 1026. The user may load pre-configured filter settings, including timing locations and window sizes (durations) for one or more of $W_{EP}$, $W_N$, and $W_A$. Alternatively, the user may use UI control elements to drag and drop a window to change its timing location, and/or to increase or decrease a window size (durations) for one or more of $W_{EP}$, $W_N$, and $W_A$.

Evoked neural activity in response to stimulation pulse $P_i$ can be detected from a portion of the evoked response signal within $W_{EP}$. Noise level can be detected from a portion of the evoked response signal within $W_N$, and an artifact of stimulation pulse $P_i$ can be detected from a portion of the evoked response signal within $W_A$.

In addition to defining various detection windows such as $W_{EP}$, $W_N$, and $W_A$, the filter setting 1020 may allow a user to configure filters to filter out or attenuate high-frequency noise or physiological interferences from the evoked response signal. As discussed above in FIG. 7, signal filtering can be a part of pre-processing of the evoked responses before detections in various detection windows. The filters may include a low-pass, a band-pass filter, or an adaptive filter.

The feature consistency setting 1030 allows a user to define a desired level of consistency for detecting the evoked response signal metric ($X_{EP}$) or the noise metric ($X_N$) in respective detection windows. The feature consistency setting 1030 determines the reliability setting (e.g., a cutoff) for the detection of the signal metric ($X_{EP}$) or the noise metric ($X_N$). For example, "Any Detection in the Window" has a lower consistency requirement than "Time locked over X %", which has a lower consistency requirement than "Time locked over all".

FIGS. 11A-11B illustrate respective GUIs 1100A and 1100B for fine-tuning detection criteria for detecting a presence of absence of an evoked neural activity based on the signal metric ($X_{EP}$) measured from the evoked neural activity detection window ($W_{EP}$), and the noise metric ($X_N$) measured from the noise detection window ($W_N$). As illustrated in FIG. 11A, the detection criterion can be fine-tuned via one or more settings including, for example, "metric(s) to compute" 1110, "detection threshold criteria" 1120, and a "detection threshold method" 1130. The "metric(s) to compute 1110" allows a user to define a signal metric ($X_{EP}$) within the evoked neural activity detection window ($W_{EP}$). In the illustrated example, the signal metric can include an "N1P2 height". An "N1P2" is a waveform pattern comprising a first negative phase followed by a second positive phase. The "N1P2 height" is a measure of peak-to-peak value of the "N1P2" waveform. In an example, the IPG 10 can detect "N1P2" pattern from the detection window $W_{EP}$. In addition to the peak-to-peak value or height, other examples of the signal metric $X_{EP}$ can include an area under the curve (AUC), or a width of a waveform pattern, such as an AUC of a "N1P2" waveform or a width of the "N1P2" waveform.

The computed signal metric $X_{EP}$, optionally along with noise metric $X_N$ determined from the noise detection window $W_N$, may be used to determine a presence or absence of an evoked neural activity. The detection feature and threshold criteria 1120 allows a user to select or define a detection feature and an associated threshold. In an example, the detection feature can be the signal metric $X_{EP}$. In another example, the detection feature can be a relative measure between the signal metric $X_{EP}$ and the noise metric $X_N$, such as a signal-to-noise ratio (SNR) between the signal metric $X_{EP}$ and the noise metric $X_N$. In the illustrated example, a user can select from a list of pre-defined detection features including a "Ratio vs. Noise RMS", a "Ratio vs. Noise Peak to Peak", "specific value(s)", and "count any feature". The "Ratio vs. Noise RMS" refers to an SNR with the noise metric $X_N$ being computed using root-mean-squared (RMS) value. The "Ratio vs. Noise Peak to Peak" refers to an SNR with the noise metric $X_N$ being computed using peak-to-peak (PP) value. The "specific value(s)" refers to using the signal metric $X_{EP}$ to detect evoked neural activity. A user may use the UI control elements to select or adjust the threshold value for the selected detection feature. In the illustrated example, the "Ratio vs. Noise RMS" is selected with a threshold being set to 1.25. In accordance with this detection feature and threshold criterion, an evoked neural activity is deemed present if the SNR (with the noise metric $X_N$ being computed using RMS value) exceeds the threshold 1.25.

The detection threshold method 1130 allows a user to select and configure a method for measuring the signal metric $X_{EP}$, the noise metric $X_N$, and the detection feature (e.g., SNR with the noise metric $X_N$ defined as RMS noise, in the illustrated example) from a train of evoked responses. As illustrated, two detection threshold methods are provided: a "direct" method and a "by proxy" method. The "direct" method 1132 refers to an explicit calculation of the signal metric $X_{EP}$, the noise metric $X_N$, and the detection feature based on an average (or other statistical pooling such as median, maximum, etc.) over a specific number (N) of epochs (pulses). When the "direct" method is selected, a representative evoked response can be computed using N evoked responses corresponding to N stimulation pulses in a pulse train. In an example where the evoked responses are represented by inter-pulse segments of a bipotential signal, a representative inter-pulse segment can be generated using N inter-pulse segments of the biopotential signal following respective N stimulation pulses. A signal metric ($X_{EP}$) and a noise metric ($X_N$) can be generated from an activity detection window ($W_{EP}$) and a noise detection window ($W_N$), respectively. A detection feature of a user's choice (e.g., "Ratio vs. Noise RMS") can be computed and compared against a programmed threshold associated with the detection feature to determine the presence or absence of an evoked neural activity.

In the example illustrated in FIG. 11A, the "Direct" method 1132 with "average #" and "8 epochs" are selected. A "direct" detection visualization 1140 shows a representative inter-pulse segment 1142 obtained by averaging eight inter-pulse segments of an evoked response signal following respective eight stimulation pulses. An activity detection window ($W_{EP}$) 1024, a noise detection window ($W_N$) 1026, and optionally an artifact window 1022, can be identified from the representative inter-pulse segment 1142. A signal metric ($X_{EP}$) can be measured as the "N1P2 height" using the data within the window $W_{EP}$ 1024, and a noise metric ($X_N$) can be computed using an RMS value of the data within the noise detection window $W_N$ 1026. The signal metric $X_{EP}$ and the noise metric $X_N$ can then be compared against the user-selected detection threshold criterion 1120. In this example, because the SNR (the ratio of N1P2 height to $\mu V_{rms}$ Noise) is no greater than the threshold 1.25, no detectable evoked neural activity is deemed present. Because the present electrostimulation does not elicit a detectable evoked neural activity, no stimulation parameter needs to be adjusted.

The "By proxy" method 1134 refers to a method of determining the number of epochs needed (up to a predetermined device limit) for averaging the evoked response signal to attain a desired noise level from the averaged signal. In contrast to the "direct" method which involves a one-time averaging (or other pooling operation) over a specific number (N) of epochs (pulses), in the "by proxy" method the number of epochs for averaging is dynamically determined based on, for example, most recent averaged evoked response. In an example, the averaging process can continue to update the average evoked responses with additional evoked responses until a noise level of the most recent updated averaged evoked response satisfies a condition, such as falling below a noise threshold. In addition to the average number, other examples of "proxy" can include median over epoch count (for salt and pepper-like noise), $\mu V_{rms}$ noise (metric inferred via SNR), maximum over epoch count, or another bulk statistical metric. In another example, the "by proxy" method determines the number of epochs for averaging based on the number of epochs necessary to make a detection (i.e., not just the noise), after attempting to detect after each epoch is averaged into the composite signal.

Figure 12:
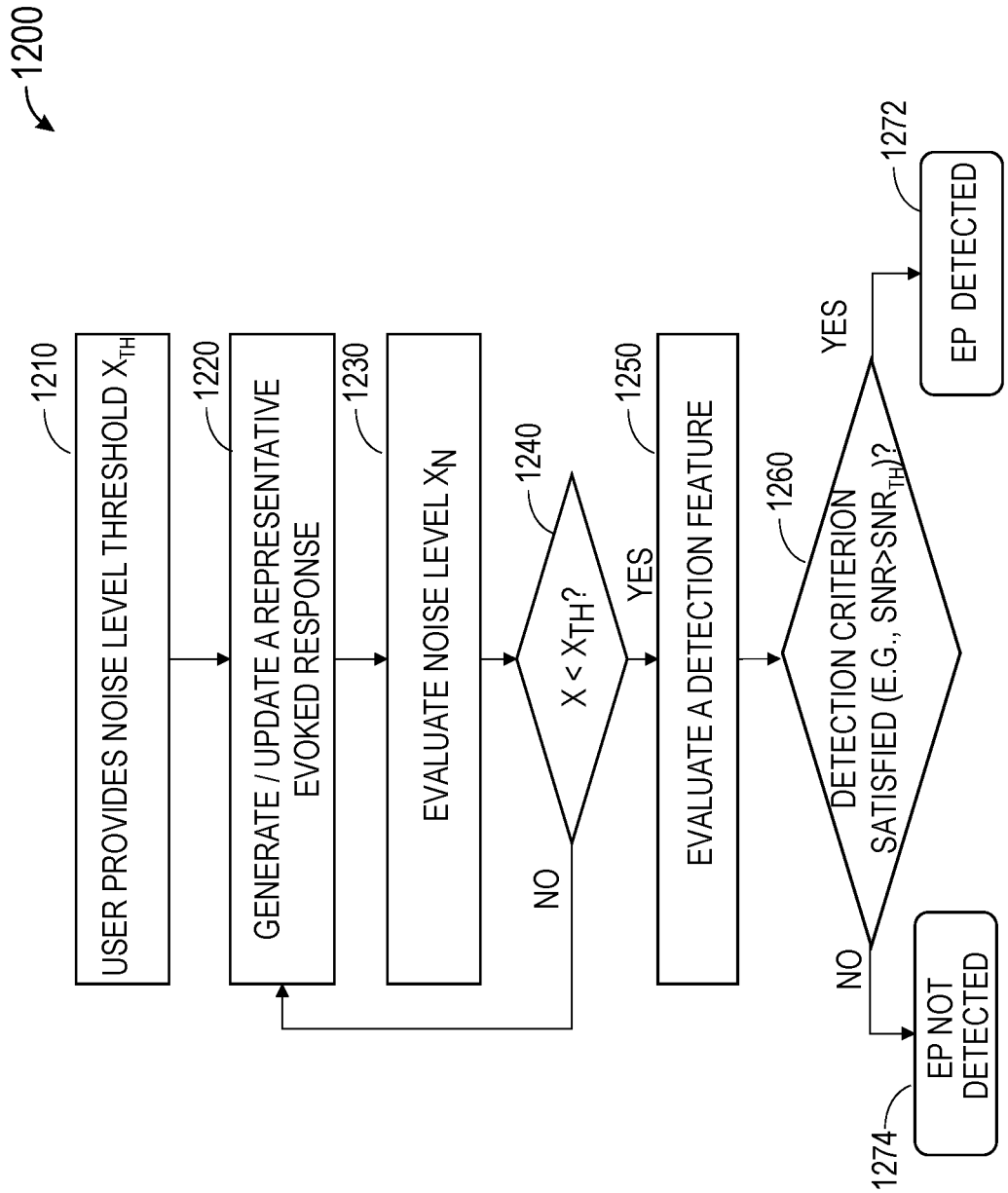
FIG. 12 is a flow chart illustrating, by way of example and not limitation, a method for detecting evoked neural activities from an averaged evoked response over multiple evoked responses, where the averaging process is controlled by a noise level of the averaged evoked response.

In the example illustrated in FIG. 11B, the "By proxy" method 1134 with "average #" and a noise threshold of "1.2 $\mu V_{rms}$" are selected. Such "By proxy" method for determining the number of epochs needed for averaging the evoked responses to attain a desired noise level is illustrated in a flow chart of FIG. 12. The method 1200 shown therein detects evoked neural activities from an averaged evoked response over multiple evoked responses, where the averaging process is controlled by a noise level of the averaged evoked response. The method 1200 can be implemented in and executed by the IPG 10, or the control circuitry 70 of the CP 50. At 1210, a user can provide a noise threshold $X_{TH}$, such as via the user interface 1100B shown in FIG. 11B. At 1220, a representative evoked response (e.g., a representative inter-pulse segment) can be generated or updated by averaging a plurality of evoked responses (e.g., inter-pulse segments of an evoked response signal) following respective stimulation pulses. As shown in FIG. 11B, "by proxy" detection visualization 1150 displays results from the "By proxy" detection, including the representative inter-pulse segment 1152.

At 1230, a noise level or noise metric $X_N$ (e.g., $\mu V_{rms}$ noise) can be measured from the averaged inter-pulse segment within the noise detection window $W_N$ 1026. The noise level $X_N$ can be compared against the noise threshold $X_{TH}$ (1.2 $\mu V_{rms}$ in this example) at 1240. As long as the noise level $X_N$ is above the noise threshold $X_{TH}$, the averaging process can continue to update the representative evoked response (e.g., the representative inter-pulse segment) at 1220 with additional epochs of evoked responses (corresponding to additional pulses), and the noise level $X_N$ can be re-evaluated in the noise detection window at 1230. As the noise is generally substantially zero-mean, when averaged over more epochs, the noise level tends to attenuate. The averaging process can continue until the noise level $X_N$ drops below the noise threshold $X_{TH}$ at 1240. The total number of epochs required for the noise level to fall below the noise threshold is determined to be a target epoch number $N_T$.

At 1250, a detection feature, such as SNR, can be computed using the signal metric $X_{EP}$ and the present noise metric $X_N$. The signal metric ($X_{EP}$) can be determined using the averaged evoked response signal within the window $W_{EP}$ 1024. At 1260, the detection feature (e.g., SNR) can be compared against a user-selected detection criterion, such as whether the SNR exceeds a $SNR_{TH}$. If the detection criterion is satisfied at 1260 (e.g., $SNR>SNR_{TH}$), then an evoked neural activity is deemed detected at 1272. This indicates that the present stimulation is at an inappropriately and unnecessarily high intensity level that would elicit detectable evoked neural activities and cause paresthesia. Accordingly, to avoid the evoked neural activities such as to maintain paresthesia-free or sub-perception electrostimulation, one or more stimulation parameters may be adjusted to reduce the stimulation energy delivered to the patient. The stimulation pulse train can then be delivered to the neural target in accordance with the adjusted stimulation parameters.

If at 1260 it is decided that the detection criterion is not satisfied (e.g., $SNR<SNR_{TH}$), then no detectable evoked neural activity is deemed present at 1274. This indicates the present stimulation is providing adequate sub-perception electrostimulation without eliciting a detectable evoked neural activity. Accordingly, no stimulation parameter needs to be adjusted, and the stimulation pulse train can be delivered to the neural target in accordance with existing stimulation parameters.

In the example illustrated in FIG. 11B, after averaging over 32 epochs, the noise level drops to 1.1 μV. Because the noise level falls below the noise threshold 1.2 μV, the averaging process stops after 32 epochs. A signal metric ($X_{EP}$) such as "N1P2 height" (the user selected metric to compute 1110), can be determined using the averaged evoked response signal within the window $W_{EP}$ 1024. An SNR can be computed using the signal metric $X_{EP}$ and the present noise metric $X_N$ (1.1 $\mu V_{rms}$). The SNR can be compared to the threshold value ($SNR_{TH}$) of 1.25. Because the SNR (the ratio of N1P2 height to $\mu V_{rms}$ Noise) is greater than the SNR threshold ($SNR_{TH}$) 1.25, a detectable evoked neural activity is deemed present.

Figure 13:
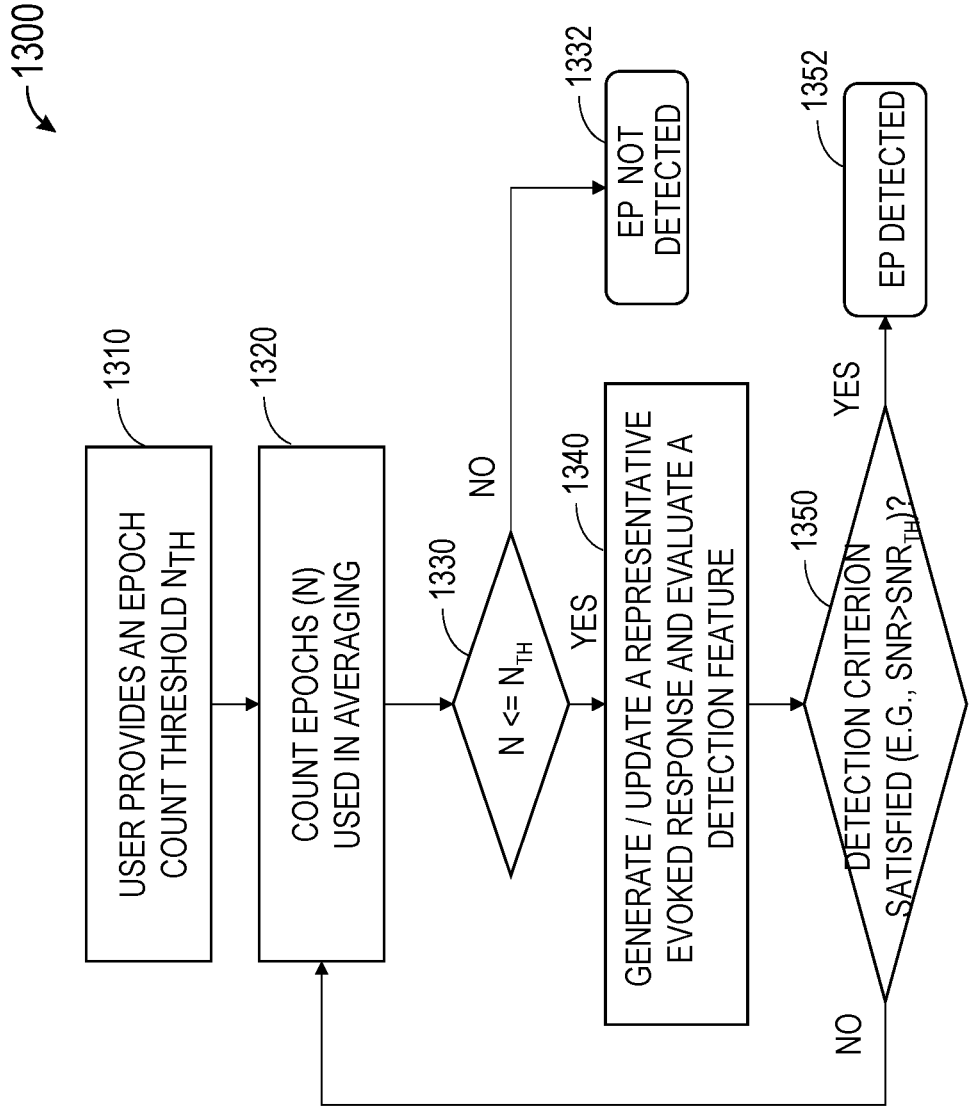
FIG. 13 is a flow chart illustrating, by way of example and not limitation, another method for detecting evoked neural activities from an average evoked response over multiple evoked responses, where the averaging process is controlled by a count of epochs (stimulation pulses) used in averaging.

In some examples, the averaging process can be controlled by the total number of epochs required for the noise level to fall below the noise threshold, i.e., the target epoch number $N_T$. As stated above, as more epochs of data are averaged, the noise level generally attenuates and the SNR increases. As such, evoked neural activities of a small amplitude that is undetectable during single stimulation epoch (i.e., SNR computed from one stimulation epoch does not exceed $SNR_{TH}$) can be detectable from an averaged evoked response over a number of epochs (e.g., the SNR exceeding the $SNR_{TH}$). However, if it takes too many epochs of averaging (e.g., exceeding a pre-determined epoch upper limit $N_{max}$) for the SNR to satisfy the detection criterion, then no evoked neural activity is deemed present. FIG. 13 is a flow chart illustrating such a method 1300 for detecting evoked neural activities from an averaged evoked response over multiple evoked responses, where the averaging process is controlled by a count of epochs (stimulation pulses) that have been used in averaging. The method 1300 can be implemented in and executed by the IPG 10 or control circuitry 70 of the CP 50.

At 1310, a user can provide an epoch count threshold $N_{TH}$. At 1320, epoch count (N) used in the averaging of the evoked responses (e.g., inter-pulse segments of an evoked biopotential signal) is determined. If the epoch count N exceeds the epoch count threshold $N_{TH}$ at 1330, the no evoked neural activity is deemed present at 1332. No stimulation parameter needs to be adjusted, and the stimulation pulse train can be delivered to the neural target in accordance with existing stimulation parameters.

If the epoch count N does not exceed the epoch count threshold $N_{TH}$ at 1330, then at 1340, a representative inter-pulse segment can be generated or updated by averaging the N evoked responses (e.g., inter-pulse segments) following respective N stimulation pulses, and a detection feature can be evaluated, such as an SNR based on the signal metric $X_{EP}$ and noise metric $X_N$ each evaluated from the representative inter-pulse segment within the signal detection window $W_{Ep}$ and the noise detection window $W_N$, respectively.

At 1350, the detection feature can be compared against a detection threshold to determine if a user-selected detection criterion can be satisfied (e.g., whether SNR exceeds $SNR_{TH}$). If the detection criterion is satisfied (e.g., $SNR>SNR_{TH}$), then an evoked neural activity is deemed detected at 1352. One or more stimulation parameters may be adjusted to reduce the stimulation energy delivered to the patient. The stimulation pulse train can then be delivered to the neural target in accordance with the adjusted stimulation parameters.

If at 1350 the detection criterion is not satisfied (e.g., $SNR<SNR_{TH}$), then the averaging process can continue to include additional epochs, the epoch count increments at 1320, and the representative evoked response can be updated and detection criterion re-evaluated at 1340, until either the epoch count (N) exceeds the threshold $N_{TH}$ (in which case a "EP not detected" decision is made at 1332) or the detection criterion is satisfied (in which case a "EP detected" decision is made at 1352.

Figure 14:
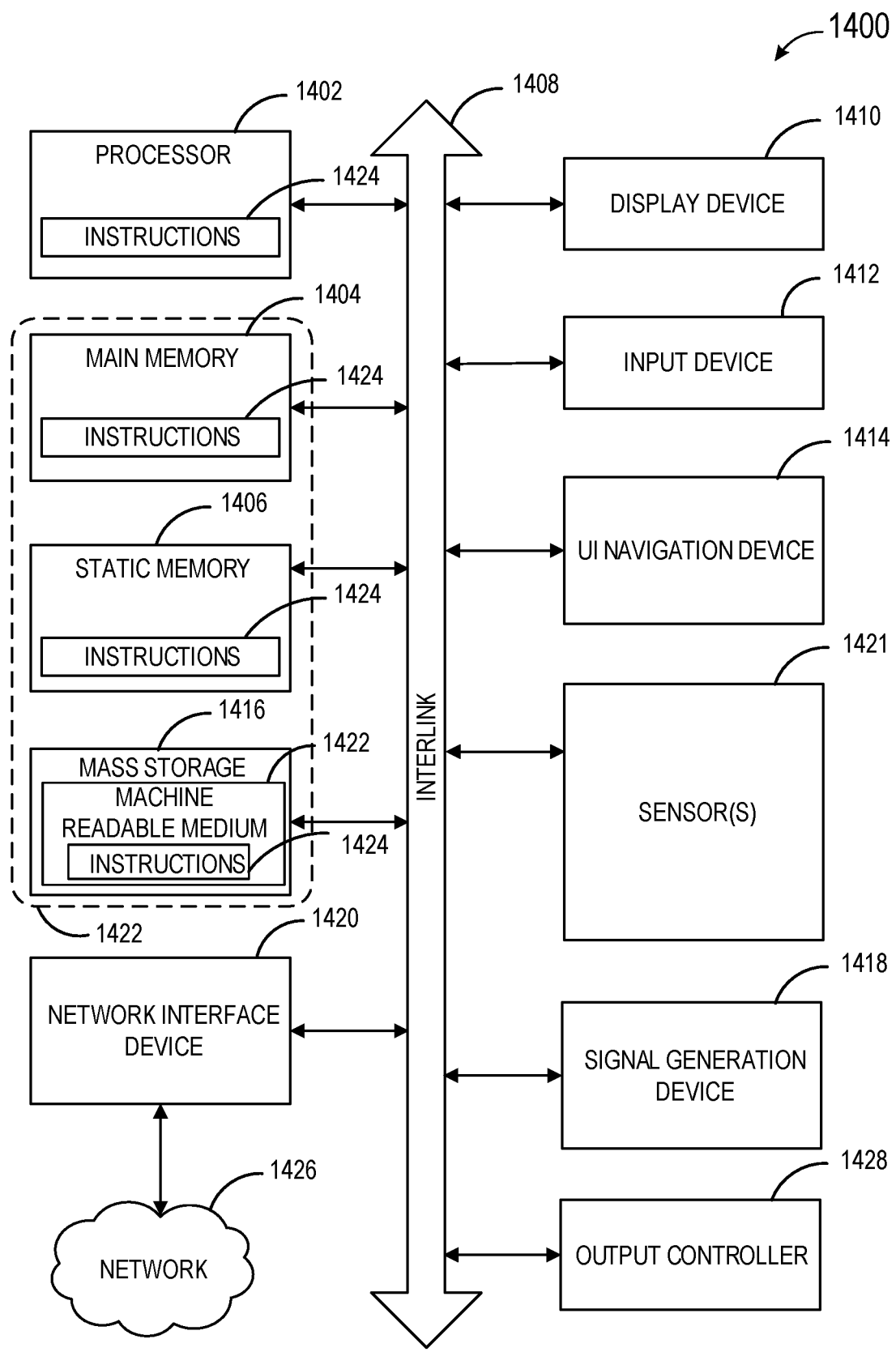
FIG. 14 illustrates generally a block diagram of an example machine upon which any one or more of the techniques (e.g., methodologies) discussed herein may perform.

FIG. 14 illustrates generally a block diagram of an example machine 1400 upon which any one or more of the techniques (e.g., methodologies) discussed herein may perform. Portions of this description may apply to the computing framework of various portions of the neuromodulation device or the external programming device.

In alternative examples, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environment. The machine 1400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), among other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1400 may include a hardware processor 1402 (e.g., a central processing unit (CPU), a graphics processing unit (GPU), a hardware processor core, algorithm specific ASIC, or any combination thereof), a main memory 1404 and a static memory 1406, some or all of which may communicate with each other via an interlink (e.g., bus) 1408. The machine 1400 may further include a display unit 1410 (e.g., a raster display, vector display, holographic display, etc.), an alphanumeric input device 1412 (e.g., a keyboard), and a user interface (UI) navigation device 1414 (e.g., a mouse). In an example, the display unit 1410, input device 1412 and UI navigation device 1414 may be a touch screen display. The machine 1400 may additionally include a storage device (e.g., drive unit) 1416, a signal generation device 1418 (e.g., a speaker), a network interface device 1420, and one or more sensors 1421, such as a global positioning system (GPS) sensor, compass, accelerometer, or other sensors. The machine 1400 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1416 may include a machine readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within static memory 1406, or within the hardware processor 1402 during execution thereof by the machine 1400. In an example, one or any combination of the hardware processor 1402, the main memory 1404, the static memory 1406, or the storage device 1416 may constitute machine readable media.

While the machine-readable medium 1422 is illustrated as a single medium, the term "machine readable medium" may include a single medium or multiple media (e.g., a centralized or distributed database, and/or associated caches and servers) configured to store the one or more instructions 1424.

The term "machine readable medium" may include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EPSOM)) and flash memory devices; magnetic disks, such as internal hard disks and removable disks; magneto-optical disks; and CD-ROM and DVD-ROM disks.

The instructions 1424 may further be transmitted or received over a communication network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WiFi®, IEEE 802.16 family of standards known as WiMax®), IEEE 802.15.4 family of standards, peer-to-peer (P2P) networks, among others. In an example, the network interface device 1420 may include one or more physical jacks (e.g., Ethernet, coaxial, or phone jacks) or one or more antennas to connect to the communication network 1426. In an example, the network interface device 1420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1400, and includes digital or analog communications signals or other intangible medium to facilitate communication of such software.

Various examples are illustrated in the figures above. One or more features from one or more of these examples may be combined to form other examples.

The method examples described herein may be machine or computer-implemented at least in part. Some examples may include a computer-readable medium or machine-readable medium encoded with instructions operable to configure an electronic device or system to perform methods as described in the above examples. An implementation of such methods may include code, such as microcode, assembly language code, a higher-level language code, or the like. Such code may include computer readable instructions for performing various methods. The code may form portions of computer program products. Further, the code may be tangibly stored on one or more volatile or non-volatile computer-readable media during execution or at other times.

The above detailed description is intended to be illustrative, and not restrictive. The scope of the disclosure should, therefore, be determined with references to the appended claims, along with the full scope of equivalents to which such claims are entitled.

What is claimed is:

1. A system for providing electrostimulation to a patient, the system comprising:
an electrostimulator configured to provide a stimulation pulse train to a neural target of the patient in accordance with one or more stimulation parameters, the stimulation pulse train comprising a plurality of pulses;
a sensing circuit configured to sense, during a stimulation surveillance phase, respective evoked responses to the plurality of pulses in the stimulation pulse train;
a user interface configured to receive a user input to program the electrostimulator; and
a controller configured to:
detect an evoked neural activity from the sensed respective evoked responses and determine a signal-to-noise metric of the evoked neural activity;
in response to the evoked neural activity satisfying a detection criterion based at least in part on the determined signal-to-noise metric, recursively adjust the one or more stimulation parameters, deliver a modified stimulation pulse train in accordance with the recursively adjusted one or more stimulation parameters, and re-detect an evoked neural activity from respective evoked responses to the modified stimulation pulse train, until the re-detected evoked neural activity fails to satisfy the detection criterion; and
generate a control signal to the electrostimulator to provide electrostimulation in accordance with the recursively adjusted one or more stimulation parameters corresponding to the re-detected evoked neural activity failing to satisfy the detection criterion.

2. The system of claim 1, wherein to recursively adjust the one or more stimulation parameters, the controller is configured to recursively reduce stimulation dosing until the re-detected evoked neural activity fails to satisfy the detection criterion,
wherein reducing stimulation dosing includes reducing one or more of simulation amplitude, pulse width, or pulse rate, or adjusting a pulse pattern.

3. The system of claim 1, wherein the controller is configured to:
determine one or more reference stimulation levels each corresponding to respective evoked neural activity detectabilities or patient perception of stimulation;
receive from the user interface a target stimulation level relative to the one or more reference stimulation levels; and
adjust the one or more stimulation parameters to achieve the target stimulation level.

4. The system of claim 1, wherein the sensing circuit is configured to sense the respective evoked responses during a pre-scheduled stimulation surveillance phase or an event-triggered stimulation surveillance phase.

5. The system of claim 1, wherein the user interface is configured to receive a user input of surveillance scheduling and configuration, and wherein in the sensing circuit is configured to sense the respective evoked responses in accordance with the surveillance scheduling and configuration,
wherein the surveillance scheduling and configuration includes a maximum pulse count dynamically determined based on a noise level of an averaged evoked response generated by averaging evoked responses to respective stimulation pulses in the stimulation pulse train.

6. The system of claim 1, wherein, to determine the signal-to-noise metric of the evoked neural activity, the controller is configured to:
generate a representative evoked response by averaging the respective evoked responses;
generate a signal metric and a noise metric from the representative evoked response; and
determine the signal-to-noise metric using the generated signal metric and the noise metric.

7. The system of claim 1, wherein the controller is configured to determine that the
evoked neural activity satisfies the detection criterion if the signal-to-noise metric exceeds a detection threshold, or fails to satisfy the detection criterion if the signal-to-noise metric is below the detection threshold.

8. The system of claim 6, wherein the controller is configured to:
in response to the noise metric failing to satisfy a noise criterion, recursively update the representative evoked response using one or more additional evoked responses to one or more additional stimulation pulses until the noise metric satisfies the noise criterion; and
in response to the noise metric satisfying the noise criterion, generate the signal metric and the noise metric from the recursively updated representative evoked response.

9. The system of claim 6, wherein the controller is configured to:
count a number of the respective evoked response being averaged to generate the representative evoked response;
in response to (i) the one or more of the signal metric or the noise metric failing to satisfy the detection criterion and (ii) the counted number being no greater than a threshold count, recursively update the representative evoked response using one or more additional evoked responses to one or more additional stimulation pulses, and generate the signal metric and the noise metric in the recursively updated representative evoked response;
determine that the evoked neural activity satisfies the detection criterion if (i) one or more of the signal metric or the noise metric satisfies the detection criterion and (ii) the counted number is no greater than the threshold count; and
determine that the evoked neural activity fails to satisfy the detection criterion if (i) one or more of the signal metric or the noise metric fails to satisfy the detection criterion and (ii) the counted number exceeds the threshold count.

10. A method for detecting an evoked neural activity in response to a stimulation pulse train delivered to a neural target of a patient, the method comprising:
sensing respective evoked responses to a plurality of pulses in the stimulation pulse train during a stimulation surveillance phase;
generating a representative evoked response by averaging the respective evoked responses;
generating a signal metric and a noise metric from the representative evoked response;
determining a signal-to-noise metric using the generated signal metric and the noise metric; and detecting a presence or absence of an evoked neural activity based at least in part on the determined signal-to-noise metric.

11. The method of claim 10, wherein:
the respective evoked responses include a plurality of inter-pulse segments of a biopotential signal in response to the stimulation pulse train, the plurality of inter-pulse segments each defined between respective two consecutive pulses of the stimulation pulse train; and
the representative evoked response includes a representative inter-pulse segment generated by averaging the plurality of inter-pulse segments.

12. The method of claim 10, wherein detecting the presence or absence of an evoked neural activity includes
detecting the presence of an evoked neural activity if the signal-to-noise metric exceeds a detection threshold, or the absence of an evoked neural activity if the signal-to-noise metric is below the detection threshold.

13. The method of claim 12, wherein the signal-to-noise metric includes a signal to noise ratio (SNR) between the signal metric and the noise metric.

14. The method of claim 12, wherein the stimulation pulse train is delivered in accordance with a stimulation program comprising specific stimulation waveform and pattern and a pre-determined SNR threshold.

15. The method of claim 10, wherein generating the representative evoked response includes averaging a user-specified number of evoked responses.

16. The method of claim 10, wherein detecting the presence or absence of an evoked neural activity includes:
in response to the noise metric failing to satisfy a noise criterion, recursively updating the representative evoked response using one or more additional evoked responses to one or more additional stimulation pulses until the noise metric satisfies the noise criterion; and
in response to the noise metric satisfying the noise criterion, generating the signal metric and the noise metric from the recursively updated representative evoked response.

17. The method of claim 10, further comprising counting a number of the respective evoked response being averaged to generate the representative evoked response,
wherein detecting the presence or absence of an evoked neural activity is further based on the counted number of the respective evoked response relative to a threshold count.

18. The method of claim 17, wherein detecting the presence or absence of an evoked neural activity includes:
in response to (i) the one or more of the signal metric or the noise metric failing to satisfy respective criteria and (ii) the counted number being no greater than the threshold count, recursively updating the representative evoked response using one or more additional evoked responses to one or more additional stimulation pulses, and generating the signal metric and the noise metric in the recursively updated representative evoked response;
detecting a presence of an evoked neural activity if (i) one or more of the signal metric or the noise metric satisfies the detection respective criteria and (ii) the counted number is no greater than the threshold count; and
detecting an absence of an evoked neural activity if (i) one or more of the signal metric or the noise metric fails to satisfy the respective criteria and (ii) the counted number exceeds the threshold count.

19. The method of claim 10, wherein the noise metric includes at least one of a root-mean-squared (RMS) value or a peak-to-peak value of a portion of the representative evoked response within a noise detection window.

20. The method of claim 10, wherein generating the signal metric includes detecting a characteristic waveform pattern from an evoked neural activity detection window in the representative evoked response, wherein the signal metric includes at least one of a peak-to-peak value, an area under the curve (AUC), or a width of the detected characteristic waveform pattern.

* * * * *